US010670439B2

(12) United States Patent
Fukaya et al.

(10) Patent No.: US 10,670,439 B2
(45) Date of Patent: Jun. 2, 2020

(54) THERMAL FLOWMETER

(71) Applicant: HITACHI AUTOMOTIVE SYSTEMS, LTD., Ibaraki (JP)

(72) Inventors: Masashi Fukaya, Tokyo (JP); Shinobu Tashiro, Hitachinaka (JP); Akira Uenodan, Hitachinaka (JP); Tomoaki Saito, Hitachinaka (JP); Naoki Saito, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 198 days.

(21) Appl. No.: 15/771,007

(22) PCT Filed: Oct. 19, 2016

(86) PCT No.: PCT/JP2016/080893
§ 371 (c)(1),
(2) Date: Apr. 25, 2018

(87) PCT Pub. No.: WO2017/073417
PCT Pub. Date: May 4, 2017

(65) Prior Publication Data
US 2018/0313680 A1    Nov. 1, 2018

(30) Foreign Application Priority Data
Oct. 28, 2015    (JP) .................................. 2015-212068

(51) Int. Cl.
*G01F 1/684* (2006.01)
*G01F 5/00* (2006.01)

(52) U.S. Cl.
CPC .............. *G01F 1/6842* (2013.01); *G01F 5/00* (2013.01)

(58) Field of Classification Search
CPC .................................. G01F 1/6842; G01F 5/00
(Continued)

(56) References Cited

U.S. PATENT DOCUMENTS

| 2012/0240668 A1 | 9/2012 | Goka et al. |
| 2013/0019675 A1 | 1/2013 | Ban et al. |

(Continued)

FOREIGN PATENT DOCUMENTS

| JP | 2012-202755 A | 10/2012 |
| JP | 2013-190447 A | 9/2013 |
| WO | 2015/045435 A1 | 4/2015 |

OTHER PUBLICATIONS

International Search Report dated Nov. 29, 2016 of the PCT International Application No. PCT/JP2016/080893.

*Primary Examiner* — Suman K Nath
(74) *Attorney, Agent, or Firm* — Volpe and Koenig, P.C.

(57) ABSTRACT

The objective is to provide a thermal flowmeter that prevents a backflow generated from a trailing vortex downstream of the thermal flowmeter from inhibiting a flow flowing out from a dust discharge port. An opening surface of a dust discharge port is formed in a position that is displaced at least with respect to the direction of a backflow of air resulting from a trailing vortex generated as a result of the flow of air at a lower end surface in which the dust discharge port is formed. The main flow in an intake pipe flows from an upstream side to a downstream side, it is possible to avoid the flow from the dust discharge port opposing head-on a backflow from a trailing vortex on the lower end surface side, and suppress a reduction in the dust discharging effect and a worsening of mass flow rate measurement errors.

11 Claims, 22 Drawing Sheets

(58) Field of Classification Search
USPC .................................................. 73/202.5
See application file for complete search history.

(56) References Cited

U.S. PATENT DOCUMENTS

2015/0168191 A1* 6/2015 Morino ................. G01F 1/6842
　　　　　　　　　　　　　　　　　　　　73/202.5
2015/0355006 A1* 12/2015 Tashiro ................... G01F 1/696
　　　　　　　　　　　　　　　　　　　　73/204.21

* cited by examiner

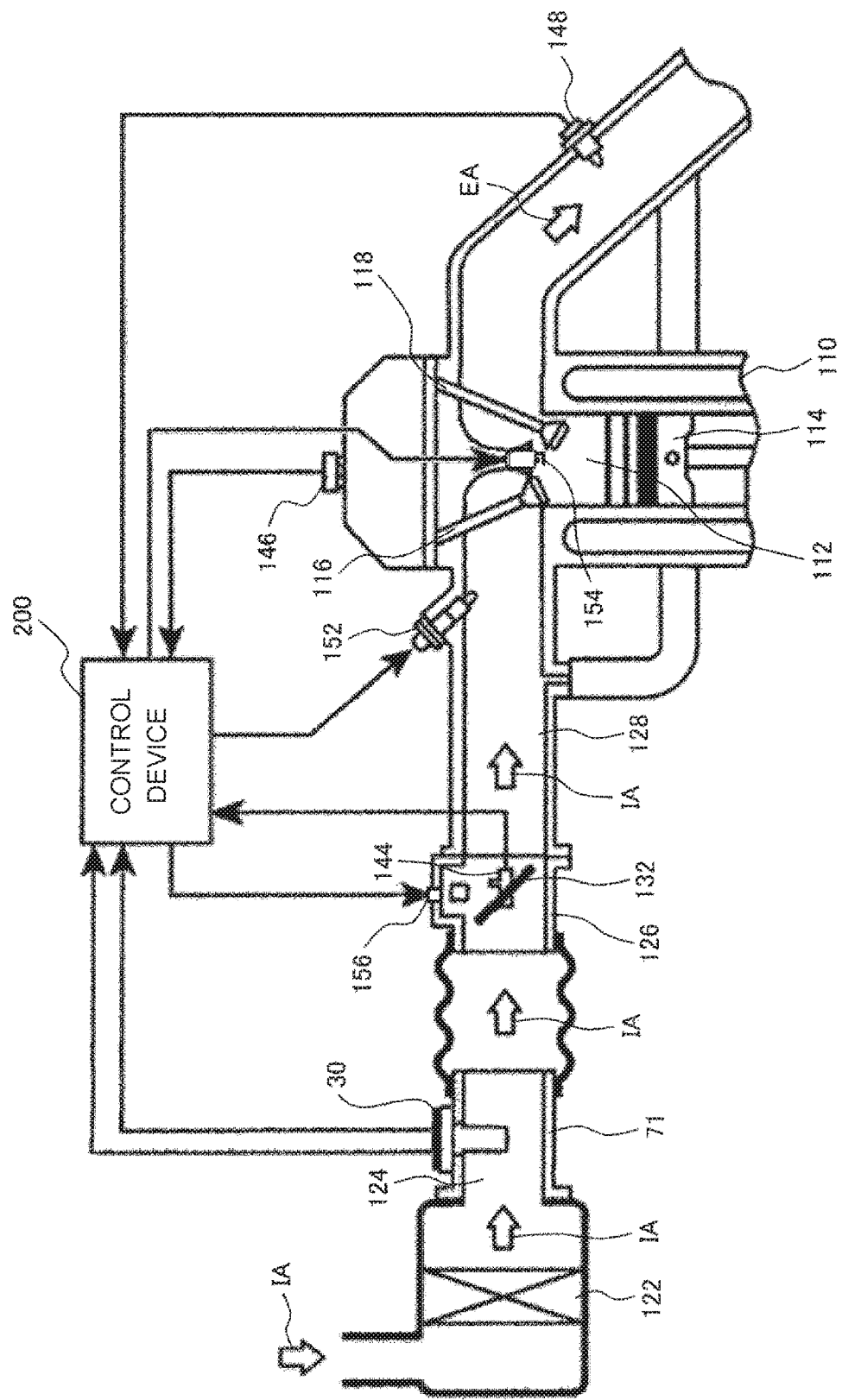
[Fig. 1]

[Fig. 2A]
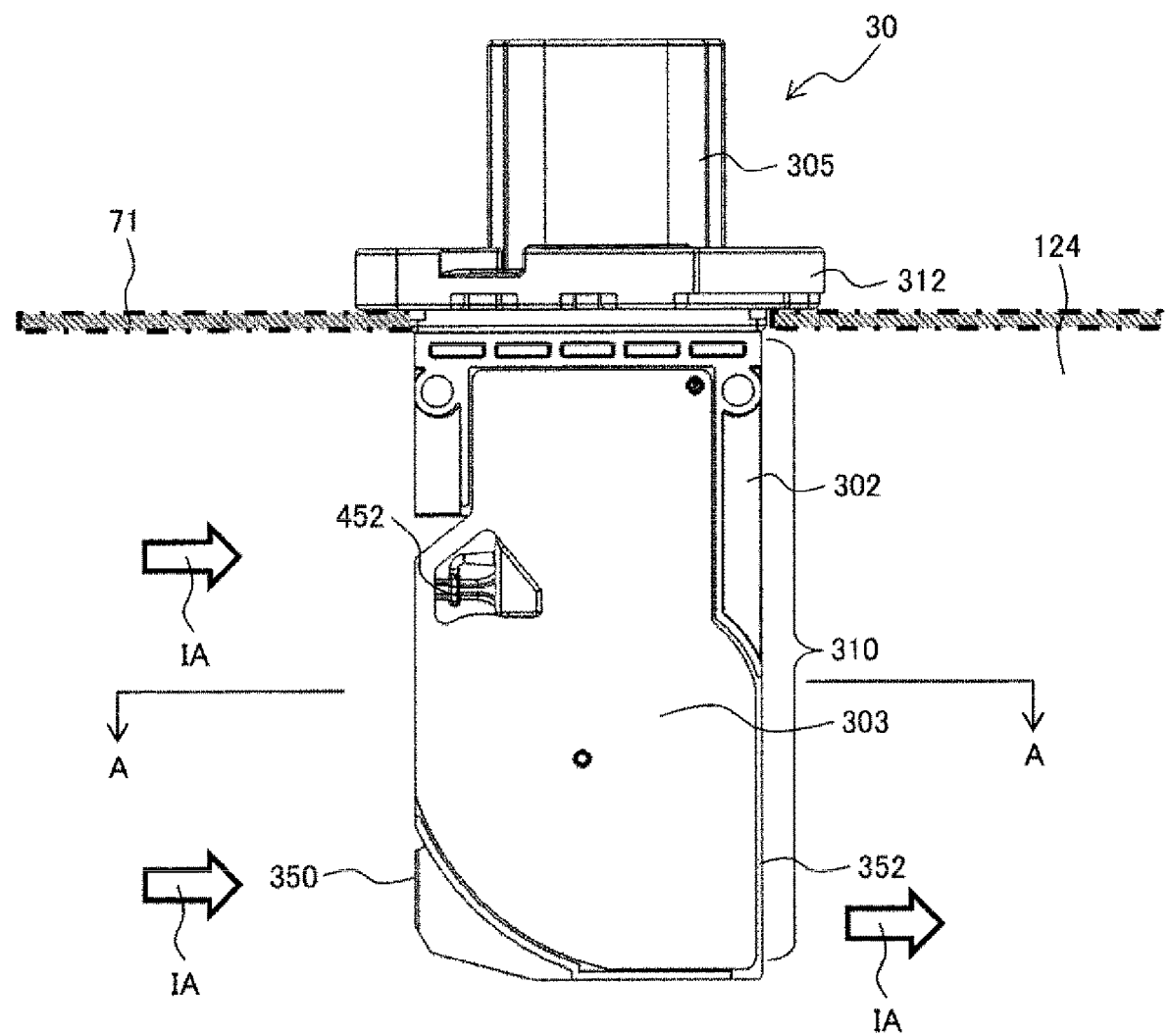

[Fig. 2B]
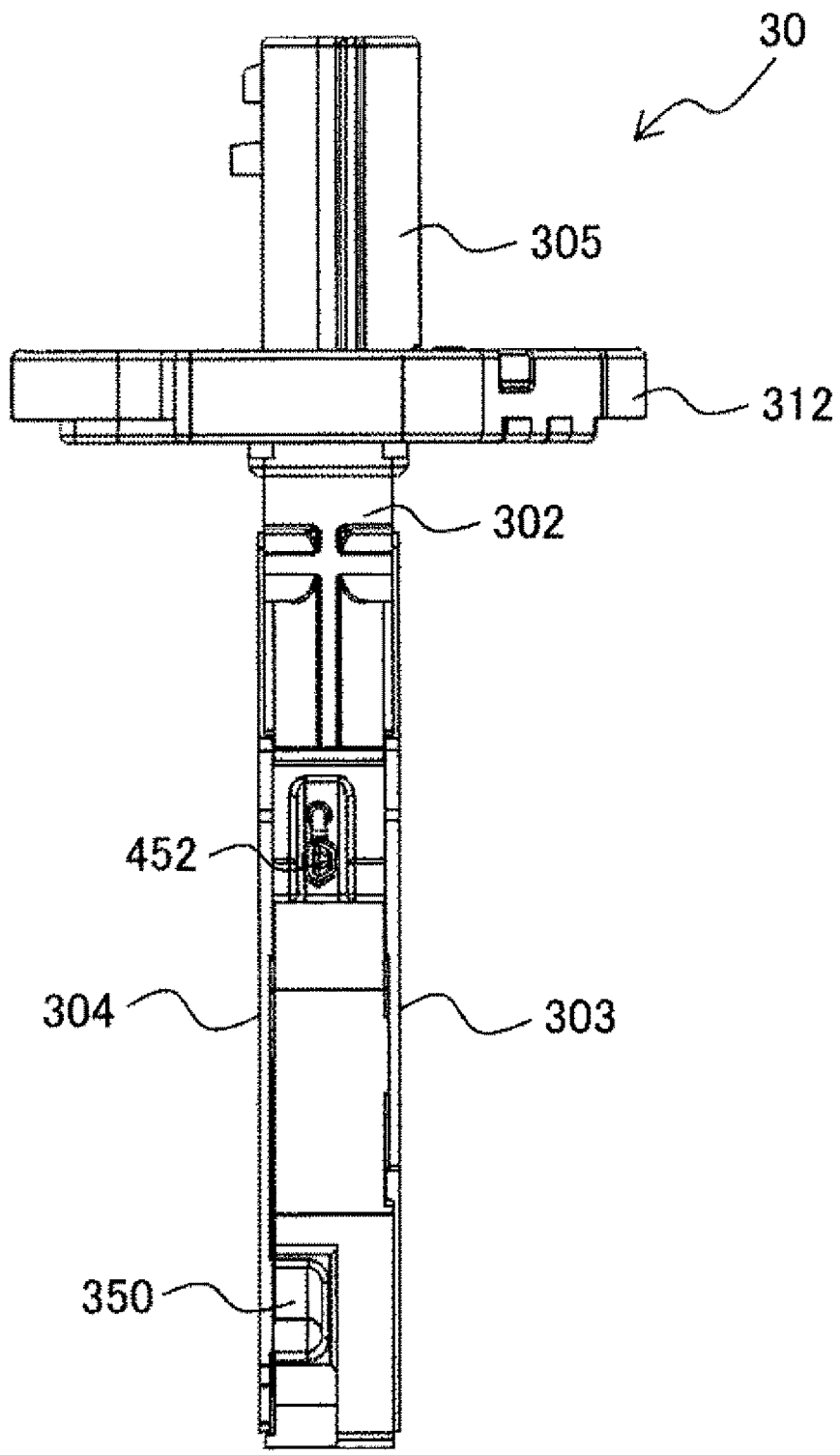

[Fig. 2C]
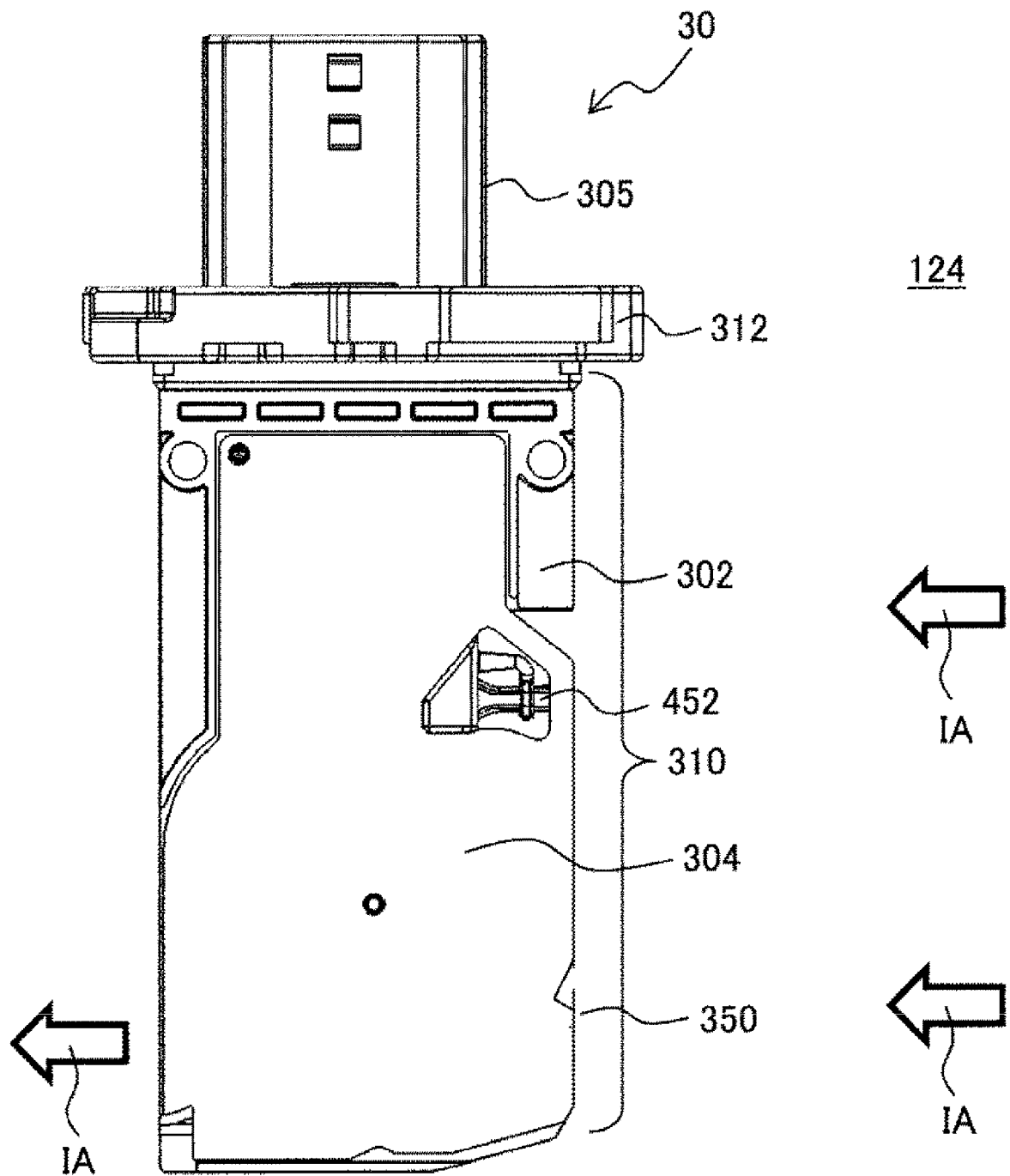

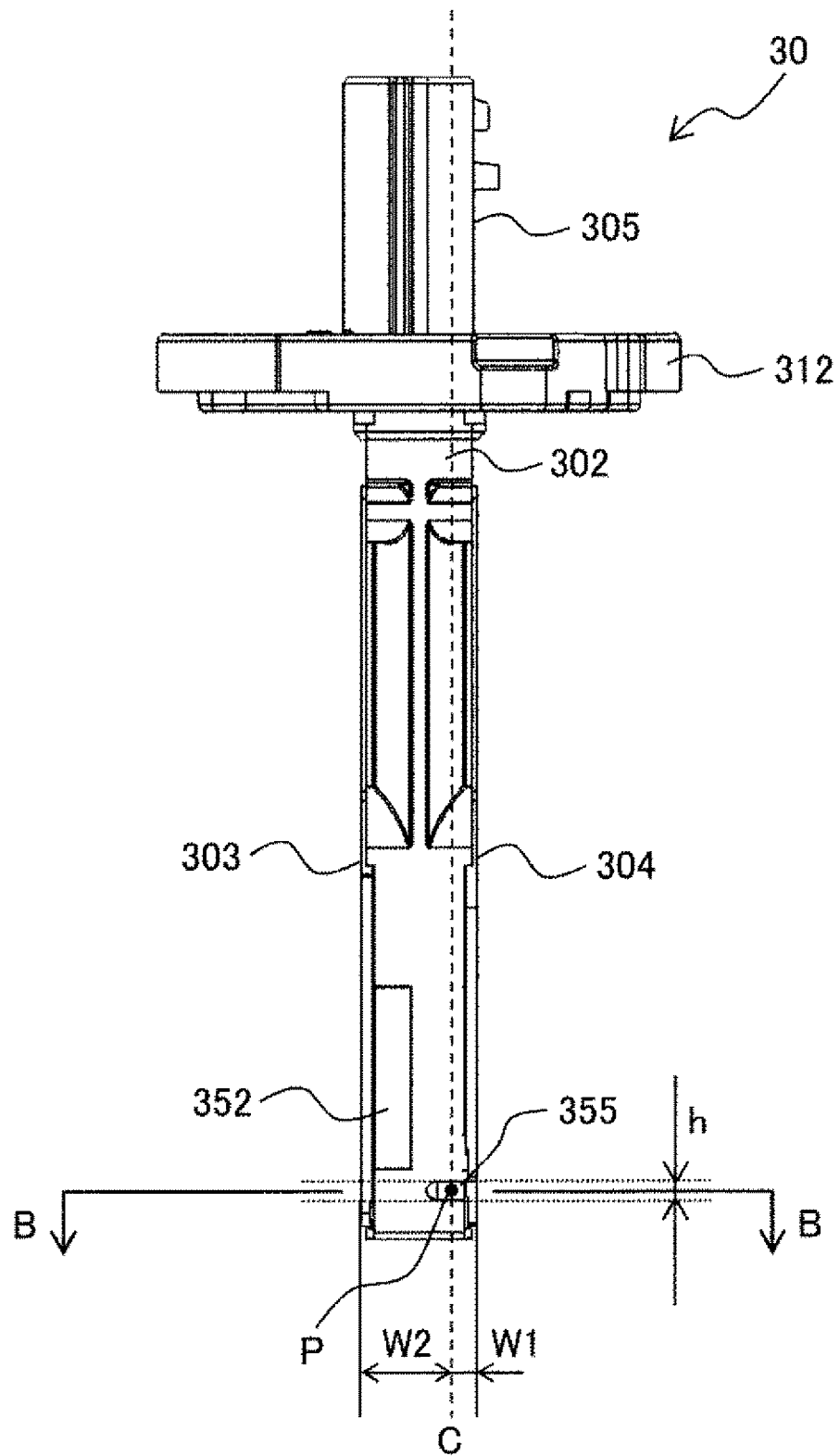
[Fig. 2D]

[Fig. 3A]
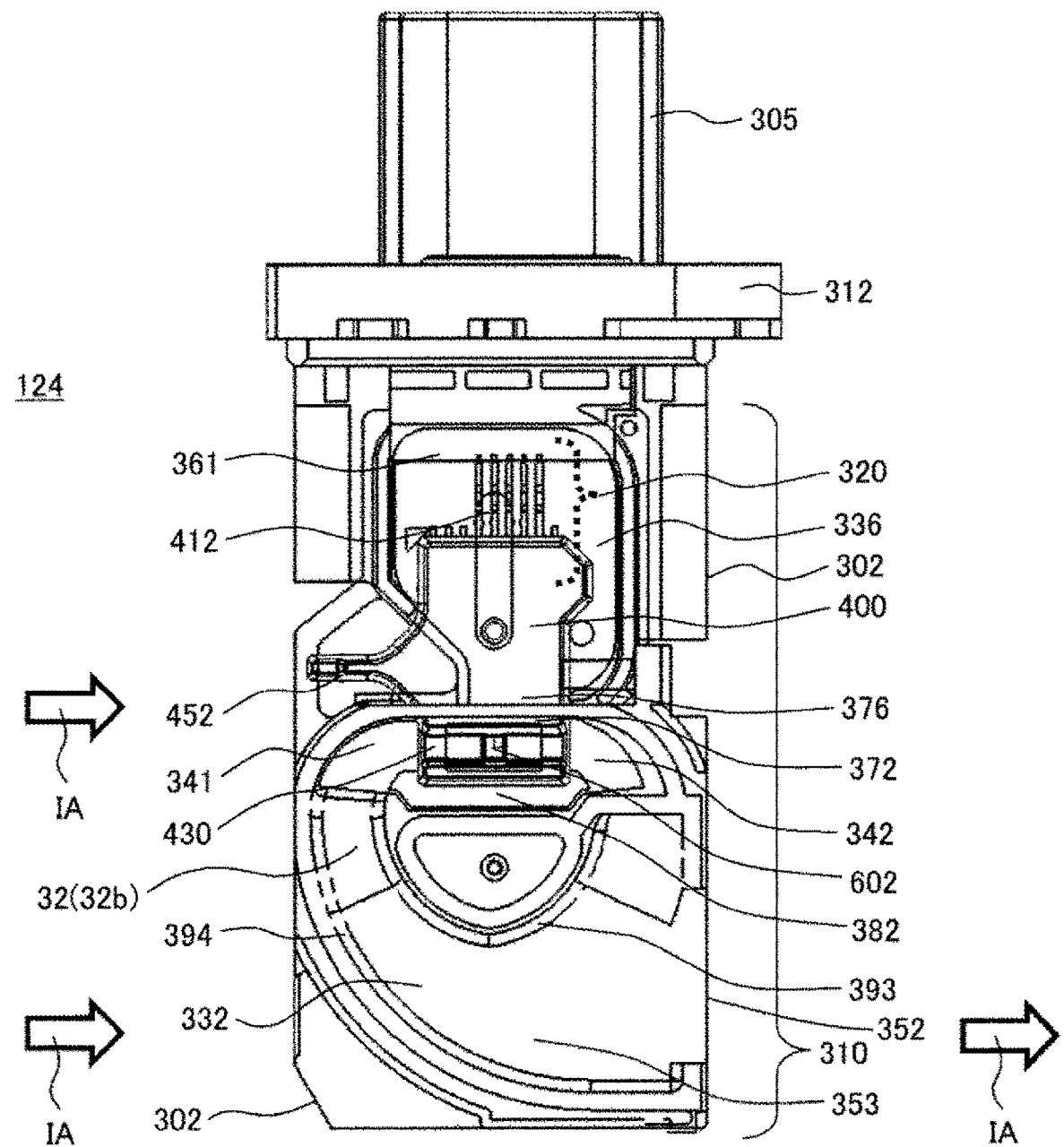

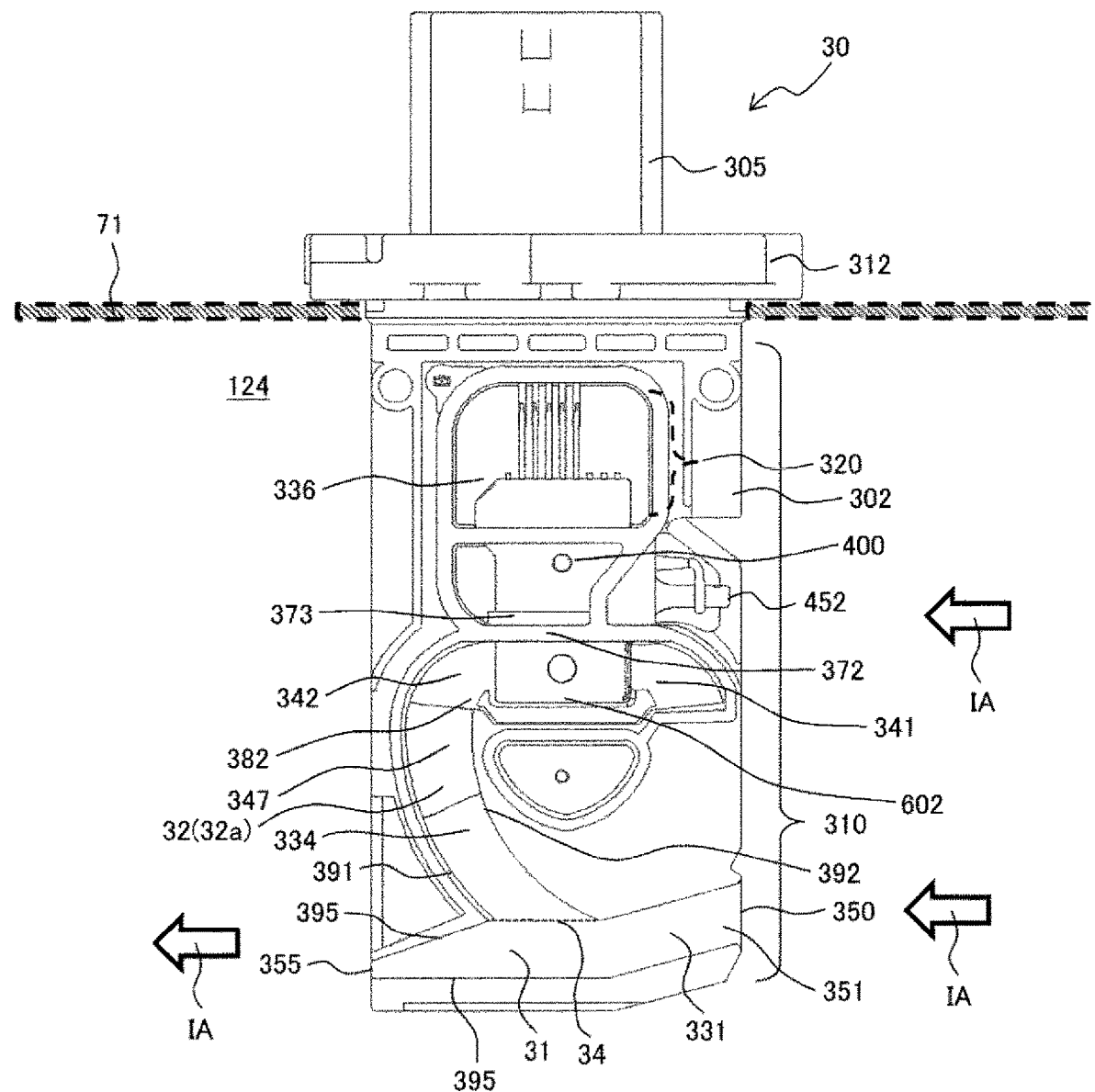
[Fig. 3B]

[Fig. 4]
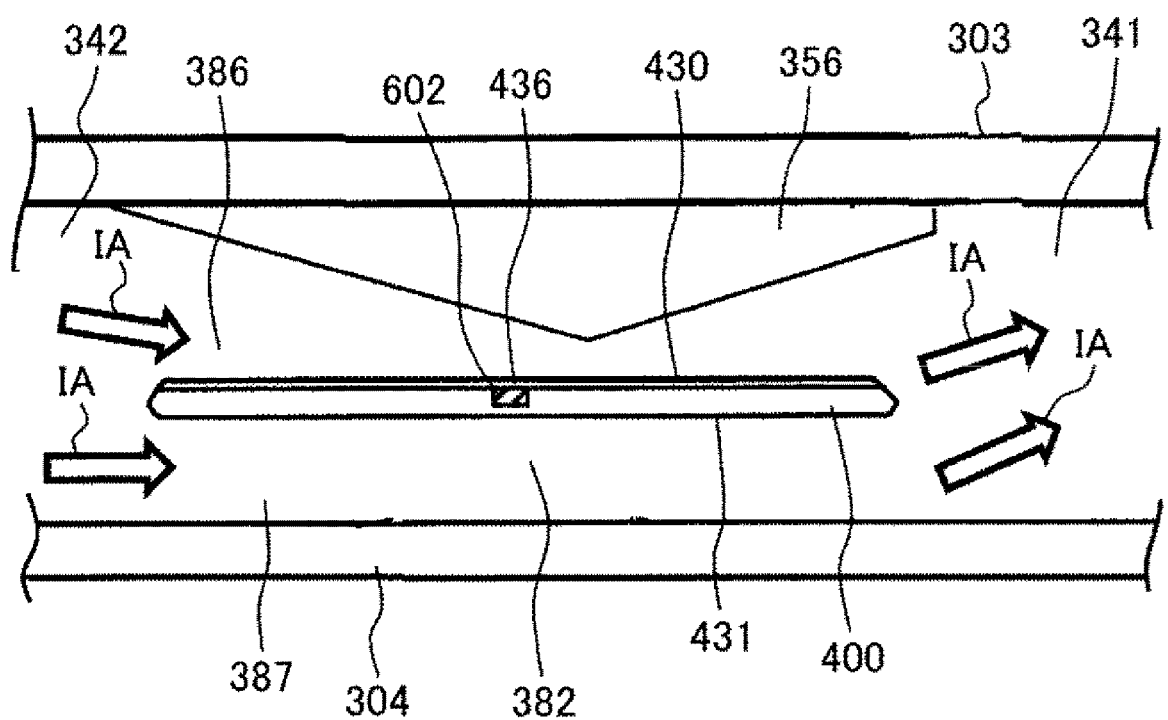

[Fig. 5]
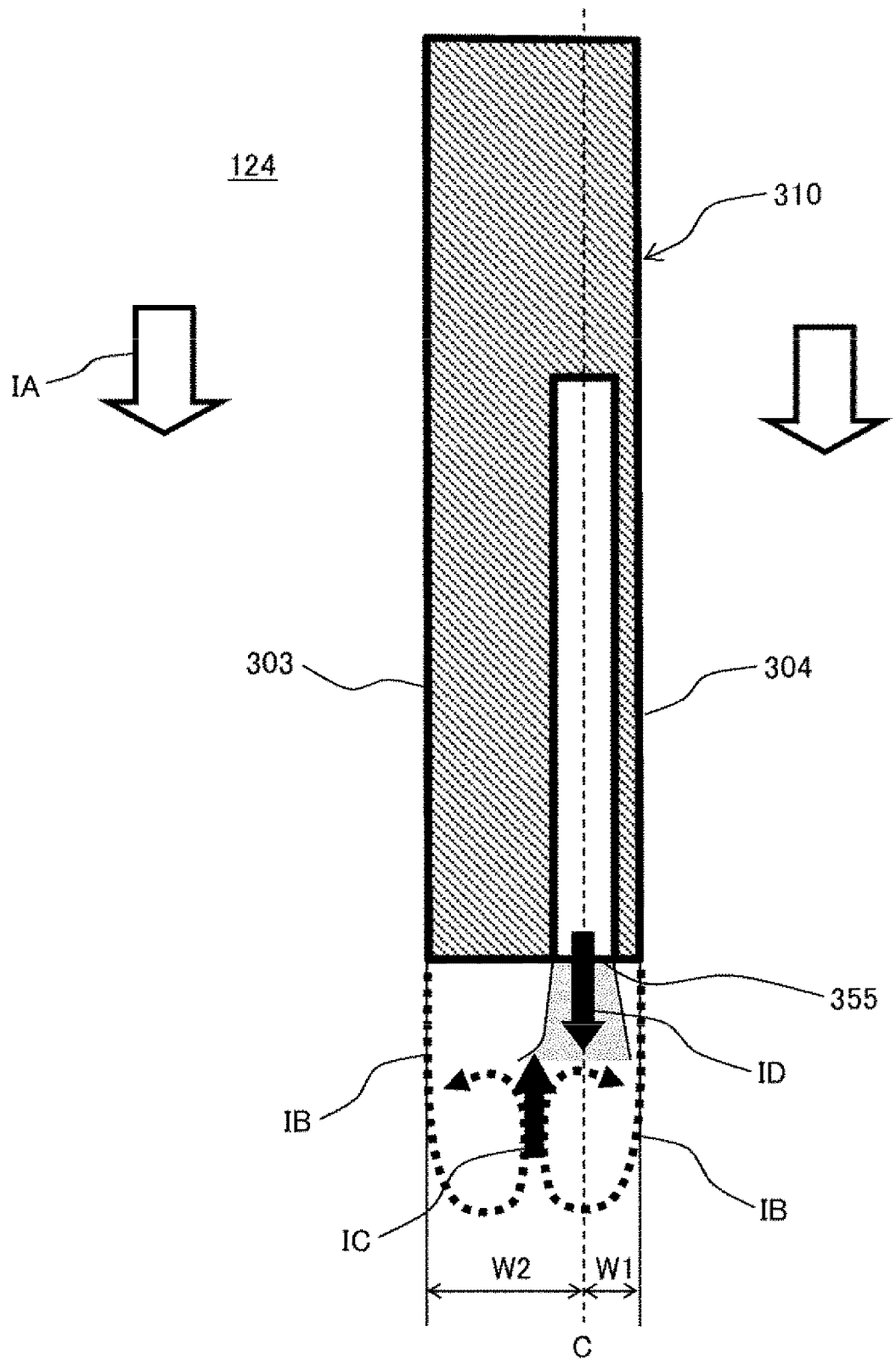

[Fig. 6]
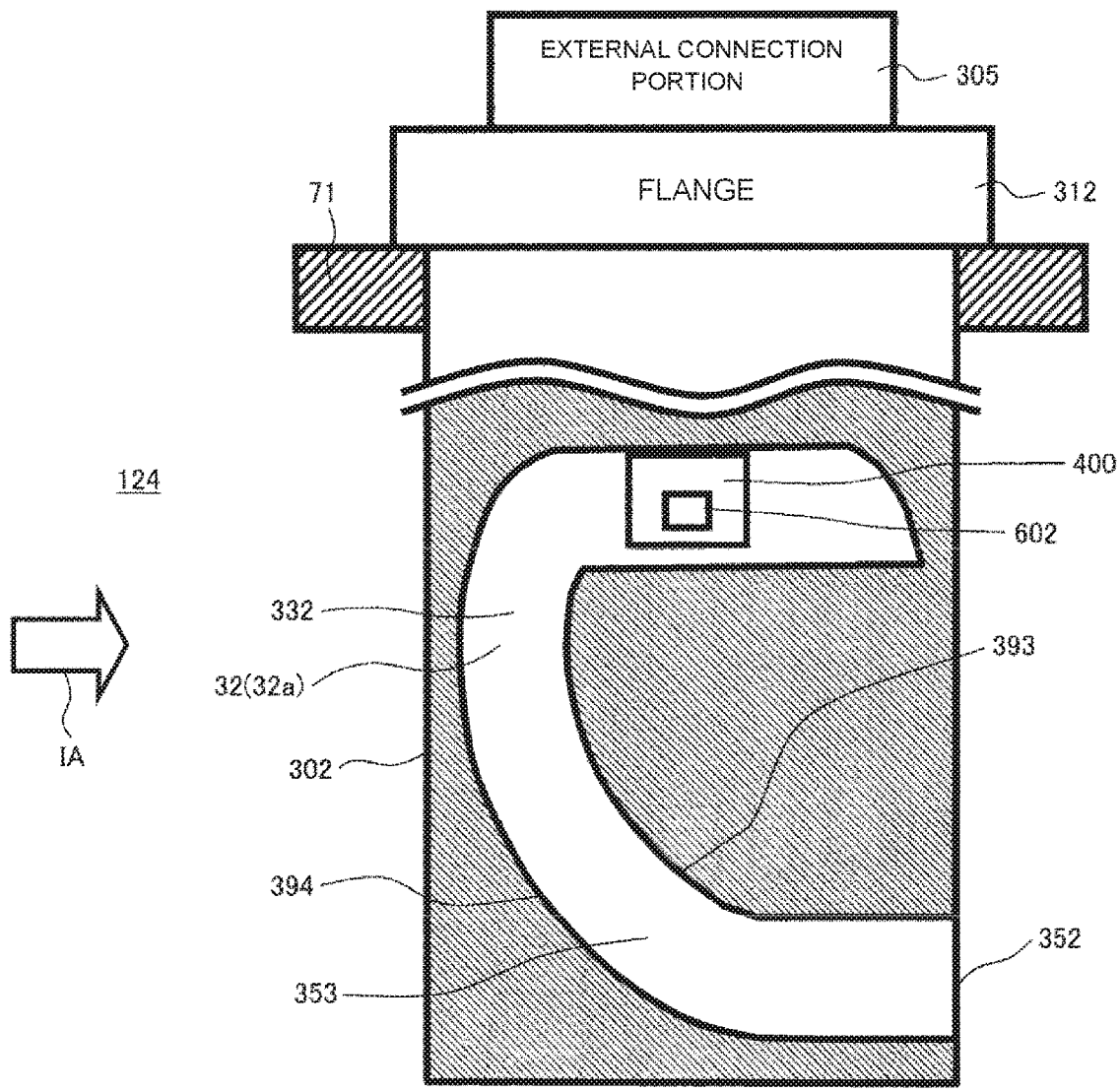

[Fig. 7]
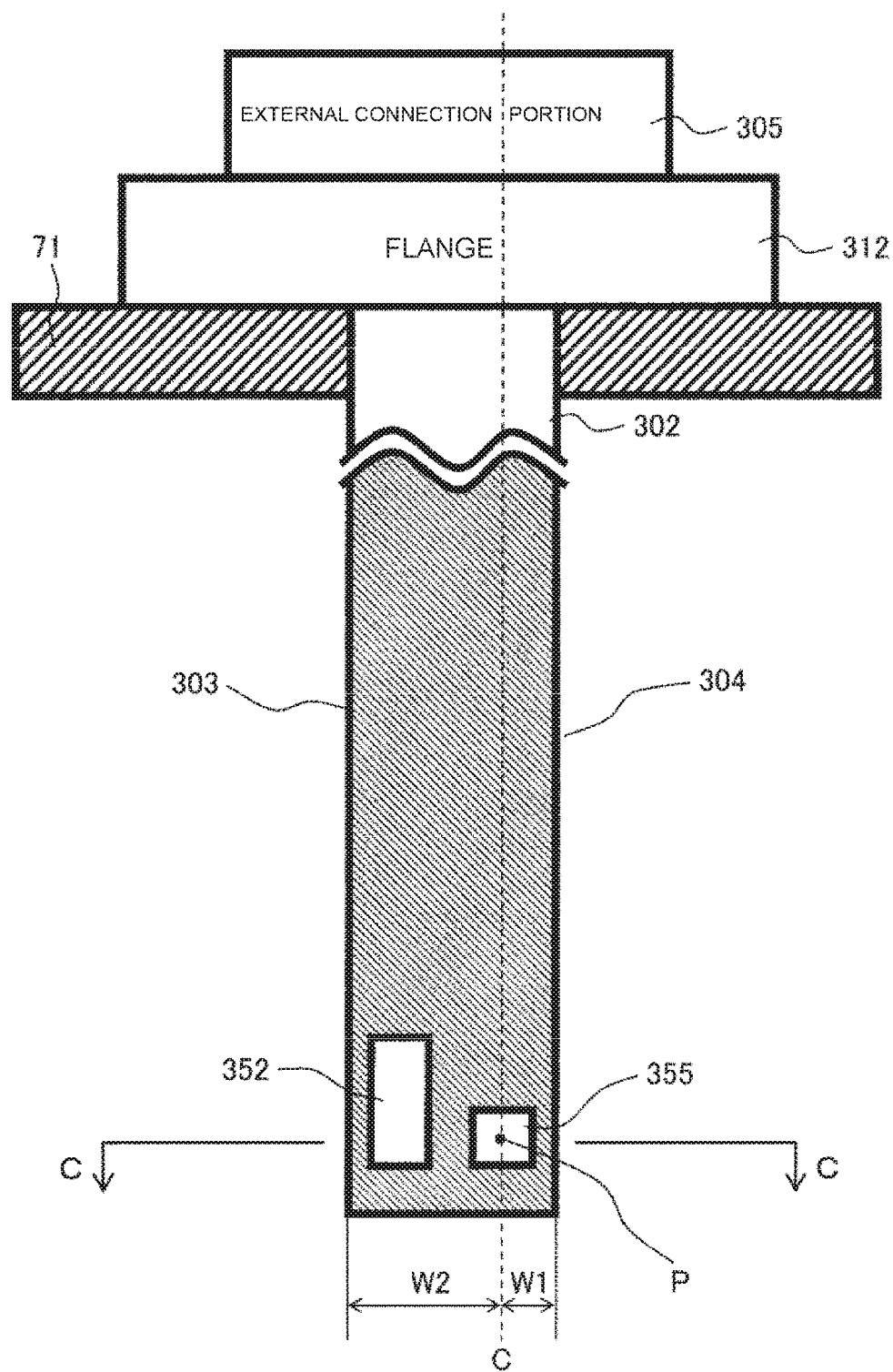

[Fig. 8]
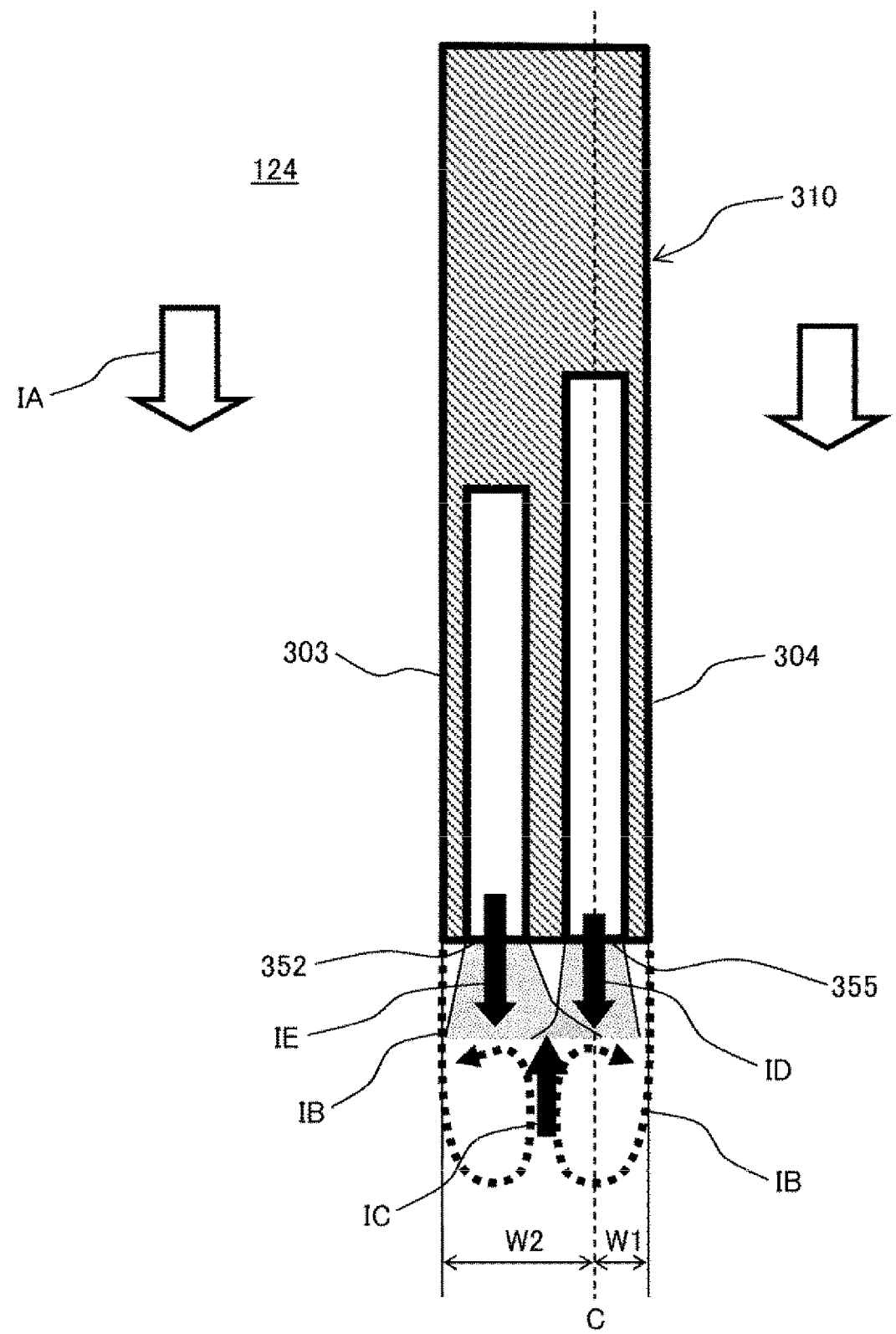

[Fig. 9]
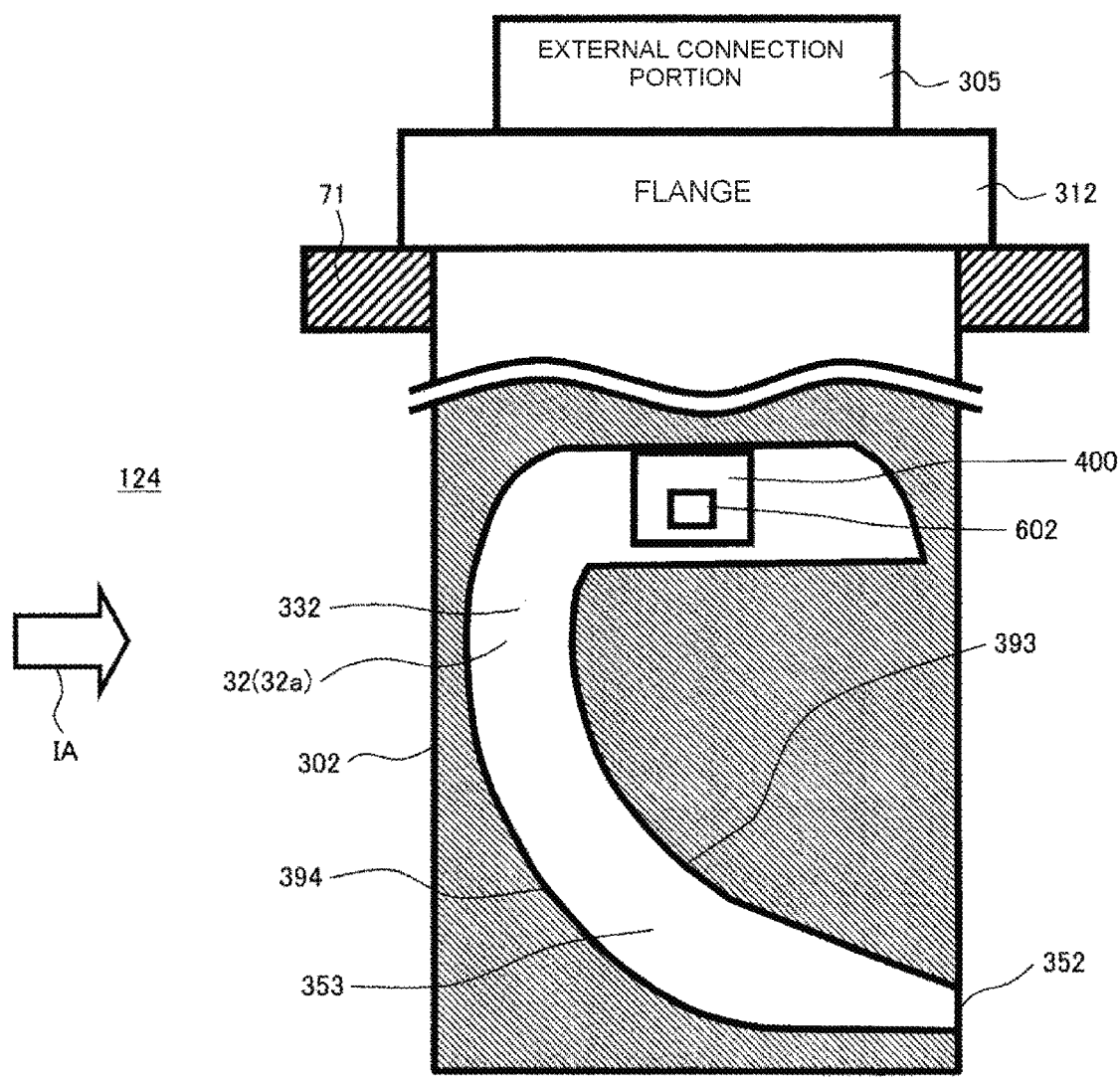

[Fig. 10]
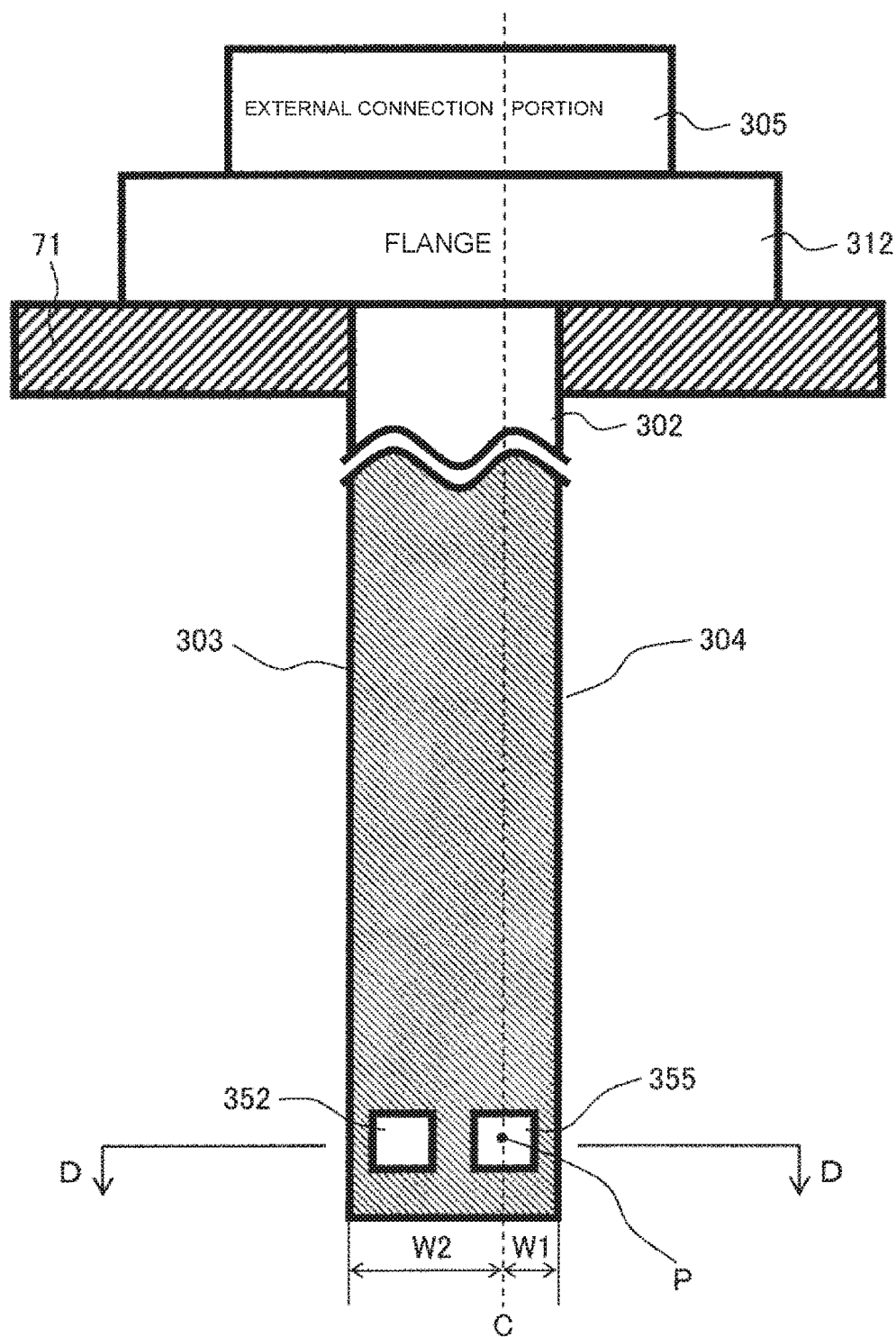

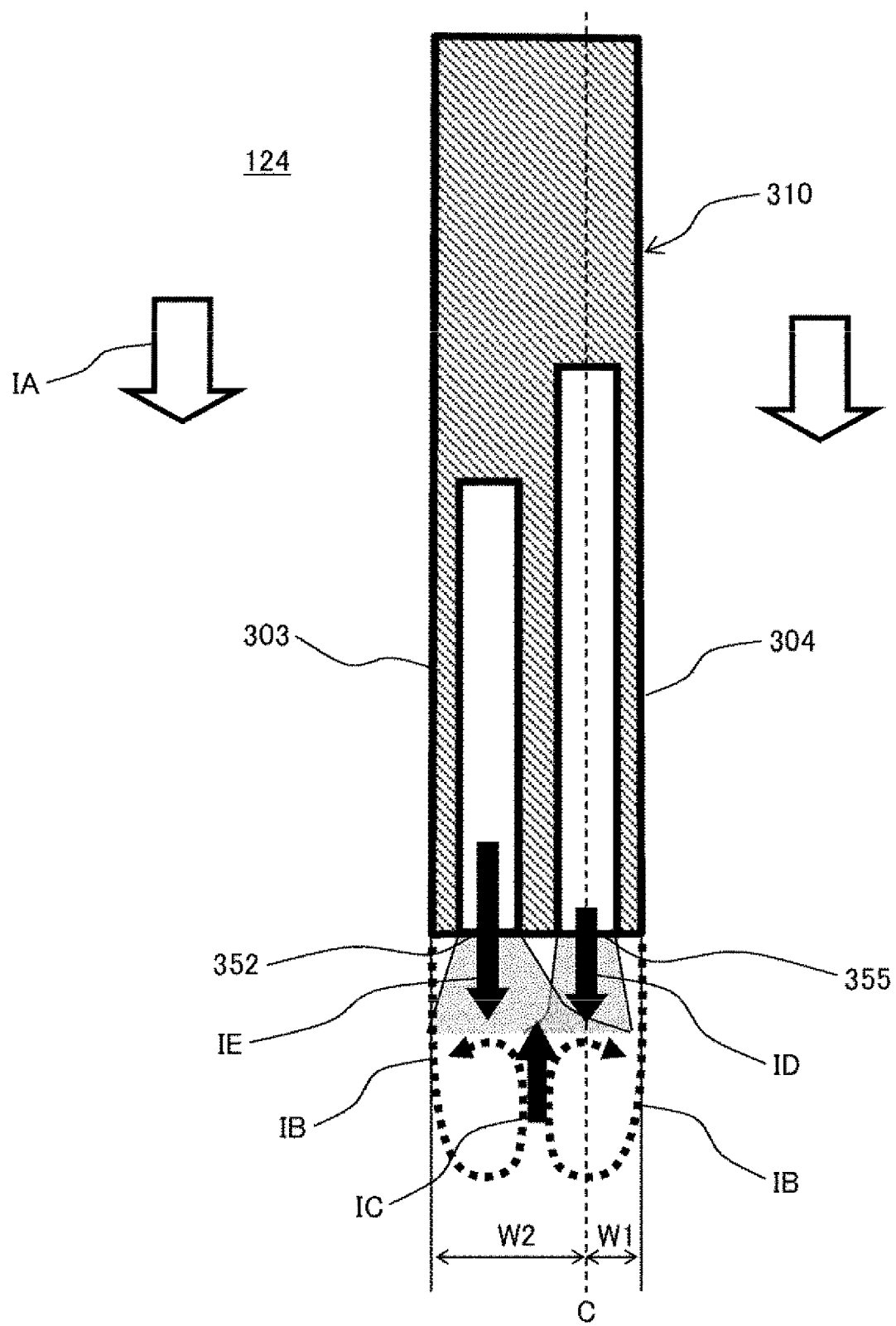
[Fig. 11]

[Fig. 12]
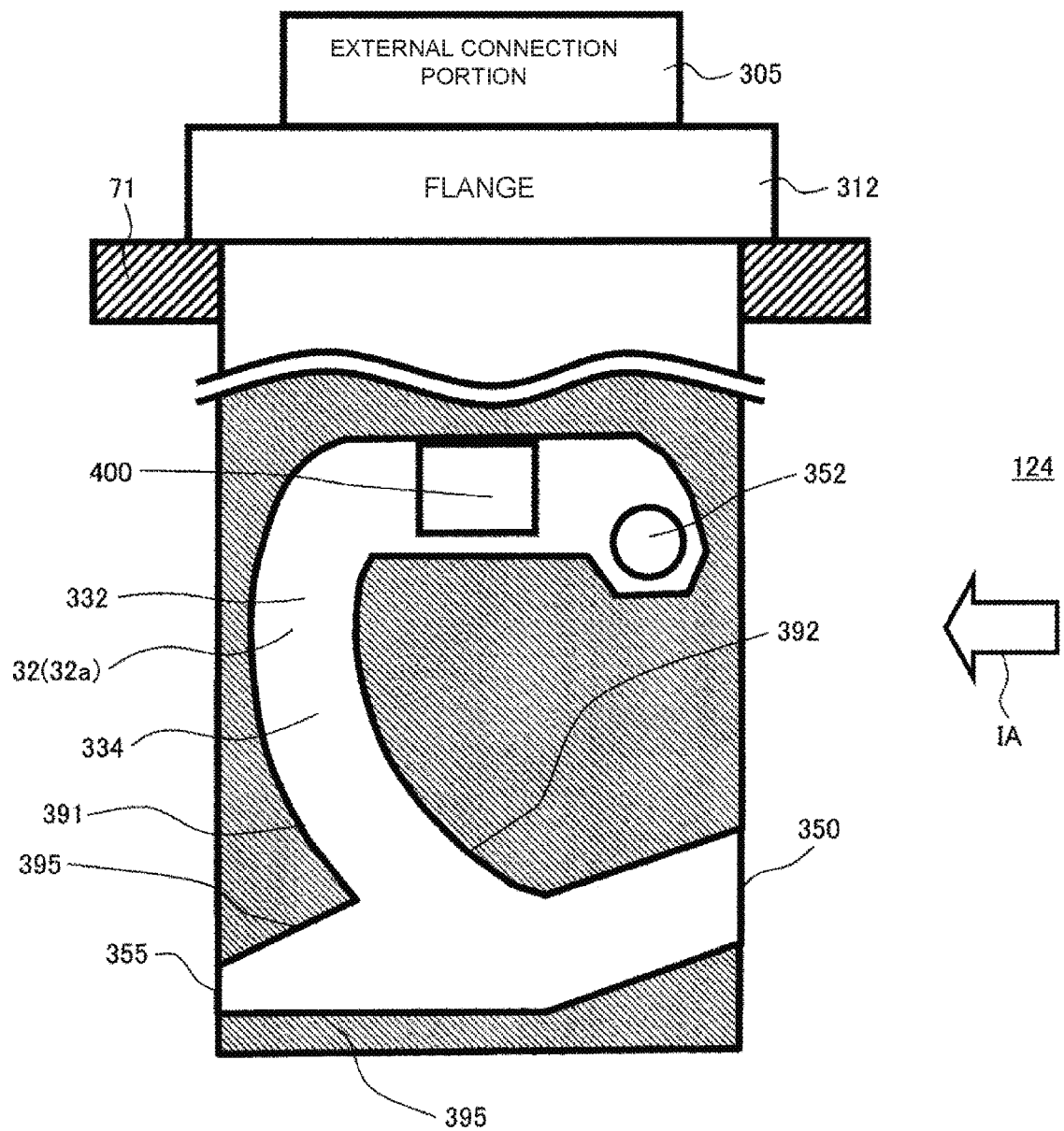

[Fig. 13]
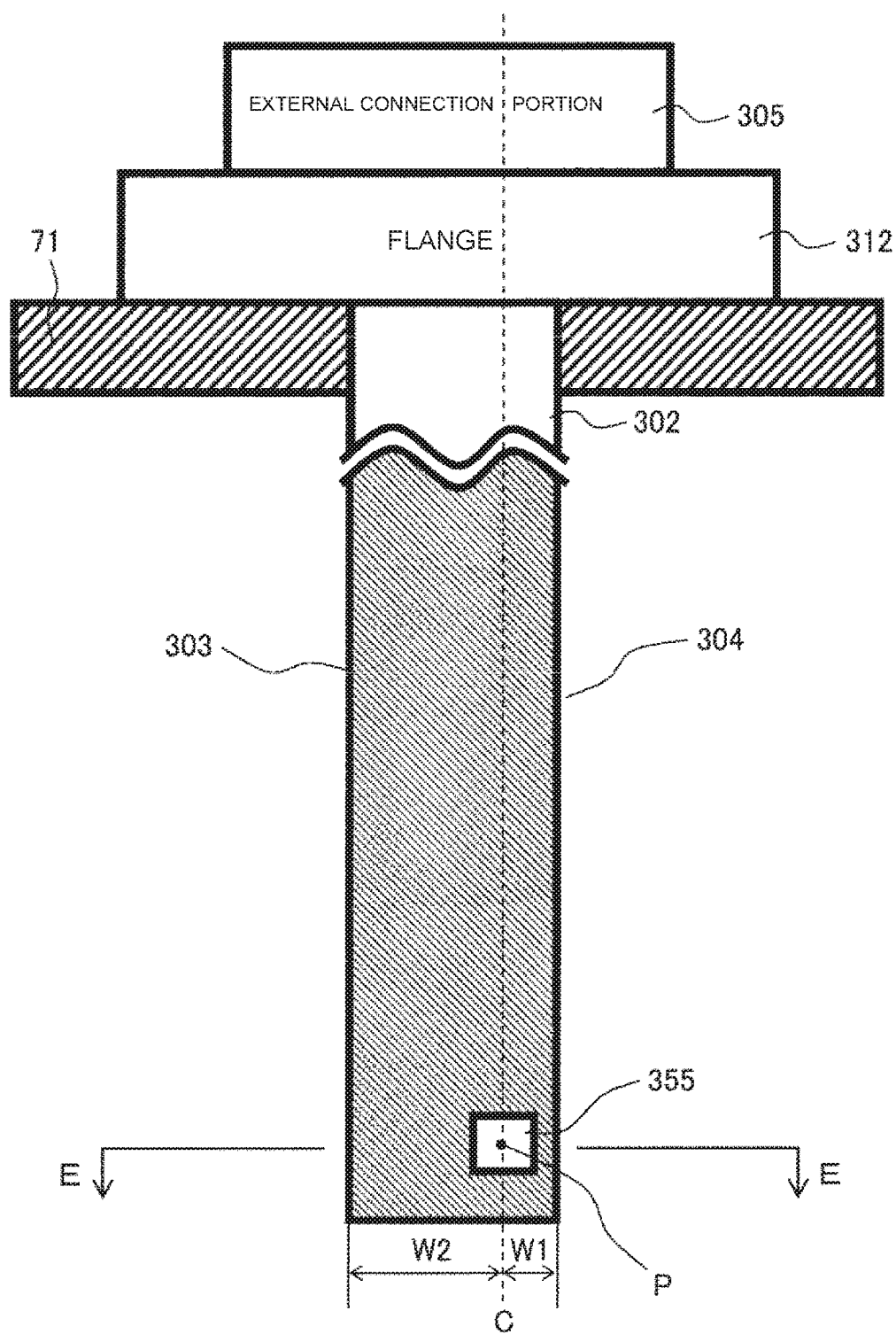

[Fig. 14]
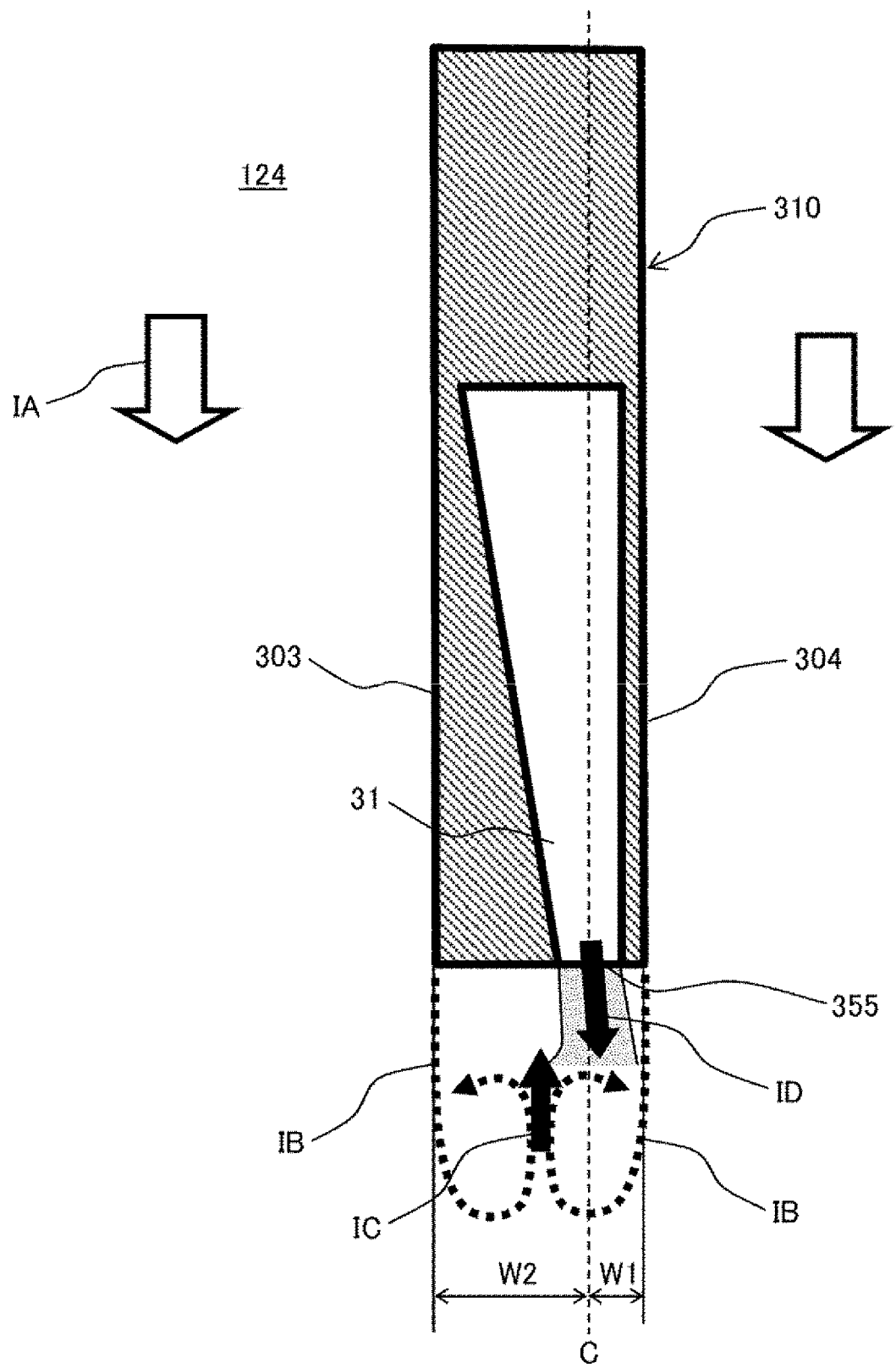

[Fig. 15]
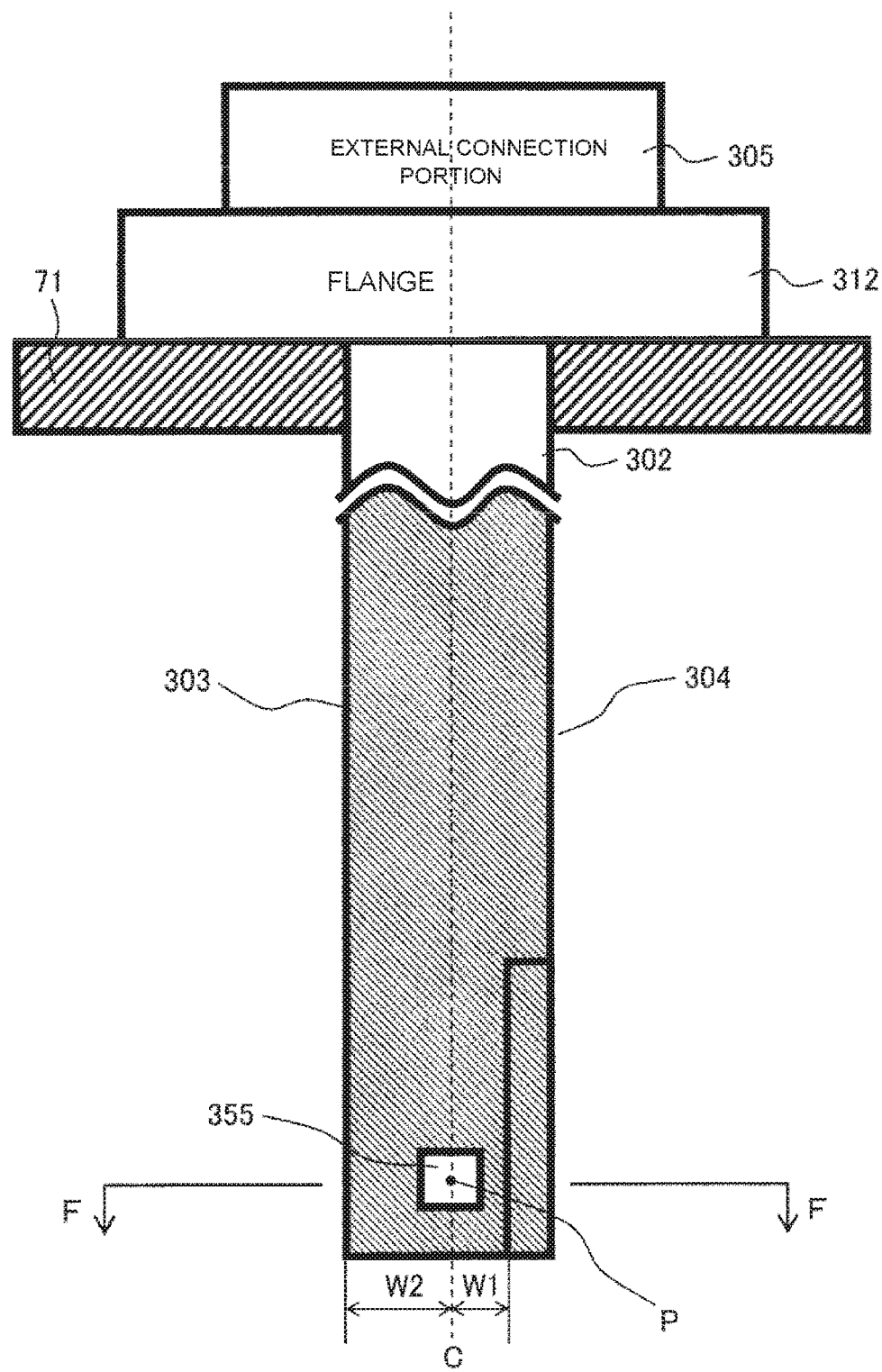

[Fig. 16]
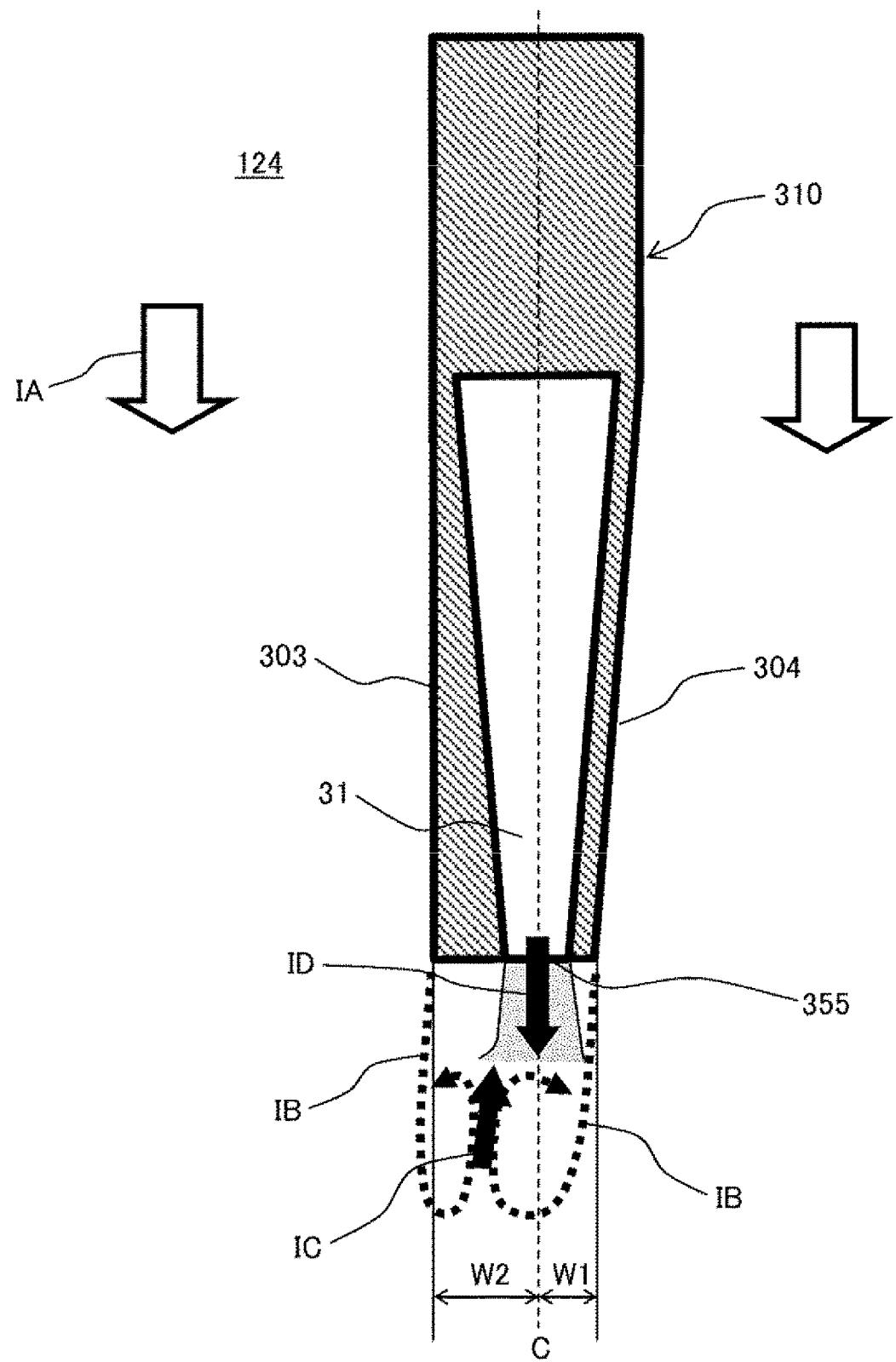

[Fig. 17]
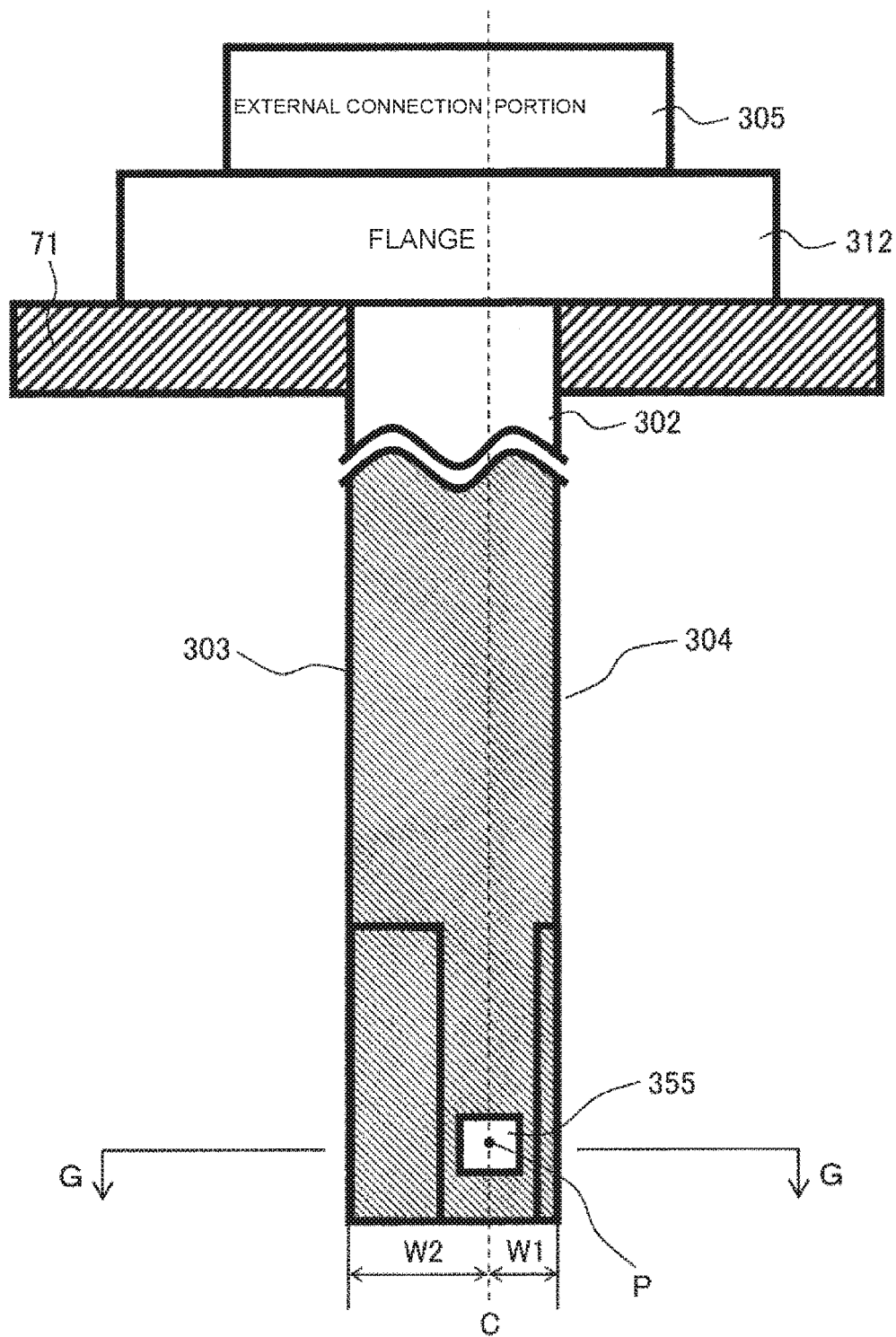

[Fig. 18]
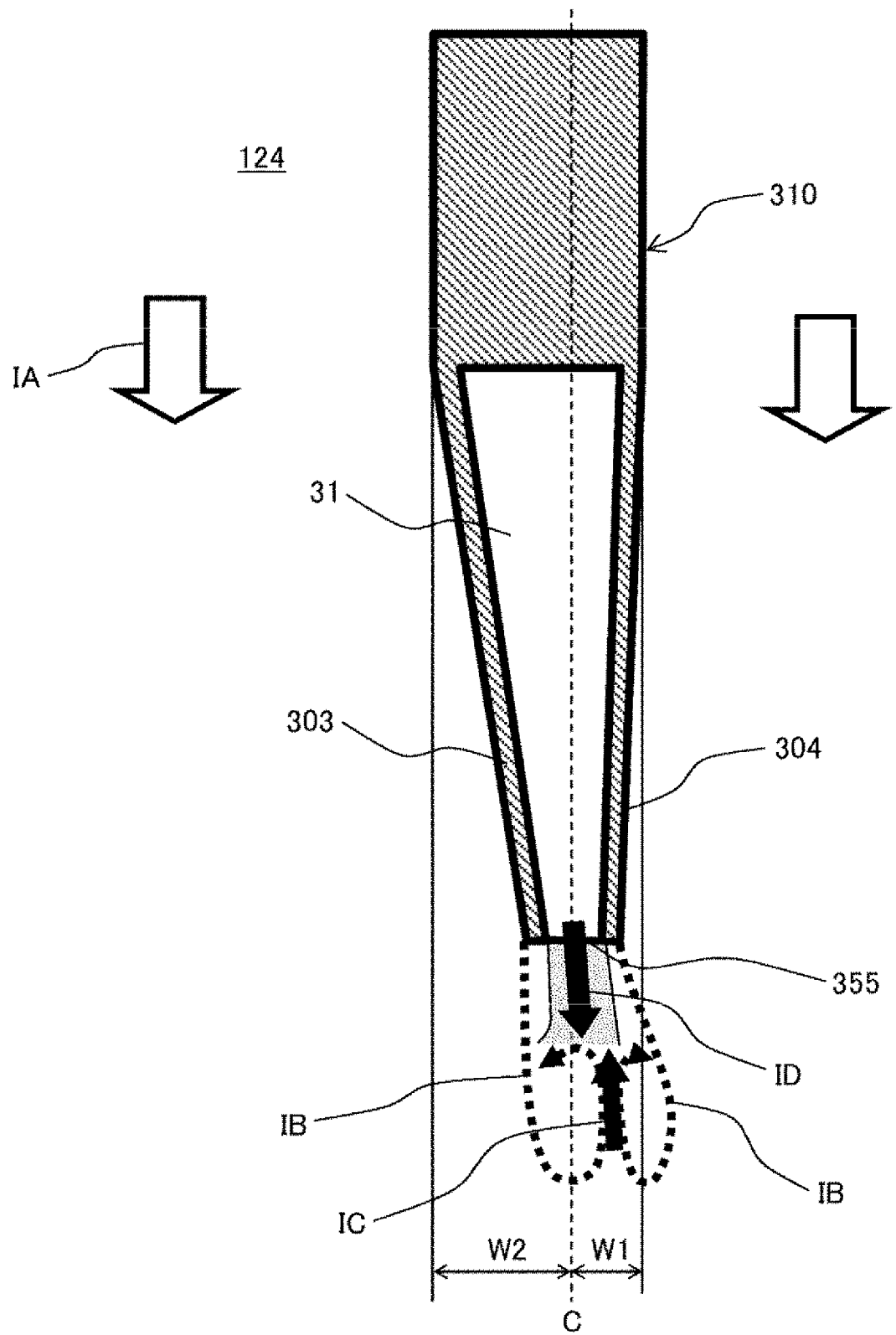

THERMAL FLOWMETER

TECHNICAL FIELD

The present invention relates to a thermal type flowmeter that measures the flow rate of a gas such as air.

BACKGROUND ART

A thermal type flowmeter that measures the flow rate of a gas such as air is provided with a flow rate measurement unit for measuring a flow rate and is configured to measure the flow rate of a gas through heat transmission between the flow rate measurement unit and the gas, which is a measurement target. The flow rate measured by the thermal type flowmeter is widely used as important control parameters of various devices. A characteristic point of the thermal type flowmeter is that the thermal type flowmeter can measure the flow rate, for example, the mass flow rate of a gas at a relatively high accuracy in comparison with other types of flowmeters.

Meanwhile, there is a demand for further improving a gas flow rate measurement accuracy of the thermal type flowmeter. For example, for a vehicle in which an internal combustion engine is installed, there is a very high demand for fuel saving or exhaust gas purification. In order to meet the demand as described above, it is needed to measure the amount of inhaled air, which is a main parameter of the internal combustion engine, at a high accuracy.

A thermal type flowmeter that measures the amount of inhaled air that is guided into an internal combustion engine is provided with a sub path into which a portion of the amount of inhaled air is taken and a flow rate measurement unit disposed in the sub path, measures the flow rate of air flowing the sub path through heat transmission between the flow rate measurement unit and the air, and outputs an electric signal indicating the amount of inhaled air that is guided to the internal combustion engine. In addition, the sub path is configured such that a stream flowing into the sub path via an inlet branches toward a bypass outlet and a dust discharging port and dust flowing into the sub path via the inlet is discharged through the dust discharging port. Therefore, the flow rate measurement unit is prevented from being damaged by the dust colliding with the flow rate measurement unit.

For example, in JP-A-2012-202755 (PTL 1), as understood from [0023] and FIG. 1, a bypass flow path is provided with an intake inlet that is open toward an upstream side of an intake path in a direction in which an intake main stream flows, an intake outlet that is open toward a downstream side of the intake path in the direction in which the intake main stream flows, a straight path that linearly extends from the inlet and in which intake air proceeds straight in the same direction as the intake main stream in the intake path, and a circular path in which intake air having proceeded straight in the straight path circles and proceeds to the outlet. Note that, the straight path is linearly connected to a dust discharging path for discharging dust and a downstream end of the dust discharging path is formed with a dust discharging port that is open toward the downstream side of the intake path in the direction in which the intake main stream flows.

In addition, in JP-A-2013-190447 (PTL 2), as understood from [0020] to [0028] and FIGS. 1 and 2, an air flow rate measuring device is provided with a flow rate sensor disposed in a sub bypass flow path that branches off from an intermediate portion of a bypass flow path. Furthermore, a line perpendicular to an opening surface of a bypass outlet is provided to extend in a direction away from a junction. That is, the opening surface does not face a main stream downstream direction straight and the opening surface faces a direction that is inclined downward in a height direction with respect to the main stream downstream direction. Since a downstream end of a second wall surface is positioned on an upstream side of a downstream end of a third wall surface in a direction in which a bypass stream flows, a possibility that dust that is reflected after colliding with the third wall surface collides with the second wall surface is low and dust colliding with the third wall surface is less likely to be discharged via the bypass outlet. Accordingly, it is possible to prevent dust from reaching the flow rate sensor.

CITATION LIST

Patent Literature

PTL 1: JP-A-2012-202755
PTL 2: JP-A-2013-190447

SUMMARY OF INVENTION

Technical Problem

However, in both of PTL 1 and PTL 2, since the thickness of the thermal type flowmeter in a direction orthogonal to an insertion direction of the thermal type flowmeter and a flowing direction in an intake pipe is symmetrical with respect to a plane that includes the centroid point of an opening surface through which the dust discharging port or the bypass outlet opens into a main path, that is perpendicular to the opening surface, and that is parallel to the insertion direction of the thermal type flowmeter, under a condition that the intake main stream flows forward from an upstream side to a downstream side, a pair of trailing vortices generated on a lower end surface side of a measurement unit main body of the thermal type flowmeter becomes substantially symmetrical. As a result, the trailing vortices join each other at a position therebetween and a reverse stream toward the lower end surface of the measurement unit main body of the thermal type flowmeter is generated. Since the reverse stream faces an air stream that flows out through the dust discharging port or the bypass outlet and hinders the air stream from flowing out, there is a problem that a dust discharging effect is decreased or error in measuring a mass flow rate becomes more significant.

An object of the invention is to provide a thermal type flowmeter in which a reverse stream that is generated due to a trailing vortex on a lower end surface side of a measurement unit main body of the thermal type flowmeter is restrained from hindering a stream flowing out through at least a dust discharging port.

Solution to Problem

A characteristic point of the invention is that at least an opening of a dust discharging port is disposed to be offset from a reverse stream direction with respect to a reverse stream that is formed due to a trailing vortex that is generated on a lower end surface of a measurement unit main body in which the dust discharging port is formed.

Advantageous Effects of Invention

According to the invention, under a condition that a main stream in an intake pipe flows in a forward direction from an upstream side to a downstream side, an air stream flowing out through a dust discharging port does not squarely face a reverse stream that is generated due to a trailing vortex on a downstream side of the measurement unit main body. As a result, it is possible to suppress a decrease in dust discharging effect and to suppress error in measuring a mass flow rate becoming more significant.

BRIEF DESCRIPTION OF DRAWINGS

FIG. 1 is a view of an internal combustion engine control system in which a thermal type flowmeter according to the invention is used.

FIG. 2A is a front view illustrating the external appearance of a thermal type flowmeter according to a first embodiment of the invention.

FIG. 2B is a left side view of the thermal type flowmeter illustrated in FIG. 2A.

FIG. 2C is a rear view of the thermal type flowmeter illustrated in FIG. 2A.

FIG. 2D is a right side view of the thermal type flowmeter illustrated in FIG. 2A.

FIG. 3A is a front view illustrating an internal configuration of a housing with a front cover removed from the thermal type flowmeter illustrated in FIG. 2A.

FIG. 3B is a rear view illustrating the internal configuration of the housing with the rear cover removed from the thermal type flowmeter illustrated in FIG. 2A.

FIG. 4 is a sectional view taken along line A-A in FIG. 2A.

FIG. 5 is a conceptual schematic view of a section taken along line B-B in FIG. 2D.

FIG. 6 is a schematic view illustrating a path configuration of a thermal type flowmeter according to a second embodiment of the invention.

FIG. 7 is a schematic view of the thermal type flowmeter illustrated in FIG. 6 as seen from a left side surface.

FIG. 8 is a sectional view taken along line C-C in FIG. 7.

FIG. 9 is a schematic view illustrating a path configuration of a thermal type flowmeter according to a third embodiment of the invention.

FIG. 10 is a schematic view of the thermal type flowmeter illustrated in FIG. 9 as seen from a left side surface.

FIG. 11 is a sectional view taken along line D-D in FIG. 10.

FIG. 12 is a schematic view illustrating a path configuration of a thermal type flowmeter according to a fourth embodiment of the invention.

FIG. 13 is a schematic view of the thermal type flowmeter illustrated in FIG. 12 as seen from a left side surface.

FIG. 14 is a sectional view taken along line E-E in FIG. 13.

FIG. 15 is a schematic view illustrating a path configuration of a thermal type flowmeter according to a fifth embodiment of the invention.

FIG. 16 is a sectional view taken along line F-F in FIG. 15.

FIG. 17 is a schematic view illustrating a path configuration of a thermal type flowmeter according to a sixth embodiment of the invention.

FIG. 18 is a sectional view taken along line G-G in FIG. 17.

DESCRIPTION OF EMBODIMENTS

Next, an embodiment of the invention will be described in detail by using drawings. However, the present invention is not limited to the embodiment described below, and various modifications and applications also fall within the technical scope of the invention.

Before describing the embodiment of the invention, a configuration of an internal combustion engine control system will be described. FIG. 1 illustrates a configuration of an electronic fuel injection type internal combustion engine control system.

As illustrated in FIG. 1, based on the motion of an internal combustion engine 110 provided with a cylinder 112 and a piston 114, an inhaled air as a measurement target gas IA is inhaled from an air cleaner 122 and the inhaled air is guided to a combustion chamber of the cylinder 112 via, for example, an intake body including an intake pipe 71 which is a pipe in which a main path 124 is formed, a throttle body 126, and an intake manifold 128.

The flow rate of the measurement target gas IA, which is the inhaled air guided to the combustion chamber, is measured by a thermal type flowmeter 30, fuel is supplied from a fuel injection valve 152 based on the measured flow rate, and the fuel is guided to the combustion chamber in a state of being an air-fuel mixture together with the measurement target gas IA, which is the inhaled air. Note that, in the present embodiment, the fuel injection valve 152 is provided in an intake port of the internal combustion engine and fuel injected into the intake port forms the air-fuel mixture together with the measurement target gas IA, which is the inhaled air, is guided to the combustion chamber via an intake valve 116, and is burned such that mechanical energy is generated.

The thermal type flowmeter 30 can be applied not only to a system in which fuel is injected into the intake port of the internal combustion engine as illustrated in FIG. 1 but also to a system in which fuel is directly injected into each combustion chamber. Both systems are approximately the same in terms of the basic concept of a method of measuring control parameters including the usage of the thermal type flowmeter 30 and a method of controlling the internal combustion engine including the amount of fuel supply and the timing of ignition and the system in which fuel is injected into the intake port is illustrated in FIG. 1 as a representative example of both systems.

The fuel and air guided to the combustion chamber are in an air-fuel mixed state and are subject to explosive combustion due to spark-ignition of an ignition plug 154 such that mechanical energy is generated. Gas after the combustion is guided to an exhaust pipe from an exhaust valve 118 and is discharged as an exhaust gas EA, to the outside from the exhaust pipe. The flow rate of the measurement target gas IA, which is the inhaled air guided to the combustion chamber, is controlled by a throttle valve 132 of which the openness changes based on an operation on an accelerator pedal. The amount of fuel supply is controlled based on the flow rate of the inhaled air guided to the combustion chamber and a driver can control mechanical energy generated by the internal combustion engine by controlling the flow rate of the inhaled air guided to the combustion chamber by controlling the openness of the throttle valve 132.

The flow rate, the humidity, and the temperature of the measurement target gas IA, which is the inhaled air that is taken in via the air cleaner 122 and flows in the main path 124, are measured by the thermal type flowmeter 30 and an electric signal indicating the flow rate, the humidity, and the temperature of the inhaled air from the thermal type flowmeter 30 is input to a control device 200. In addition, output from a throttle angle sensor 144 that measures the openness of the throttle valve 132 is input to the control device 200, and output from a rotation angle sensor 146 is input to the control device 200 in order to measure the position and the state of the piston 114, the intake valve 116, or the exhaust valve 118 of the internal combustion engine and the rotation speed of the internal combustion engine. In order to measure the state of a mixture ratio between the amount of fuel and the amount of air from the state of the exhaust gas EA, output from an oxygen sensor 148 is input to the control device 200.

The control device 200 calculates the amount of fuel injection and the timing of ignition based on the flow rate, the humidity, and the temperature of the inhaled air, which is output from the thermal type flowmeter 30, and the rotation speed of the internal combustion engine from the rotation angle sensor 146. Based on the result of the calculation, the amount of fuel supplied from the fuel injection valve 152 and the timing of ignition at which ignition is performed by the ignition plug 154 are controlled. Actually, the amount of fuel supply and the timing of ignition are controlled based on the state of change in intake temperature measured by the thermal type flowmeter 30 or throttle angle, the state of change in engine rotation speed, and the state of an air-fuel ratio measured by the oxygen sensor 148 in addition to the above-described factors. Furthermore, the control device 200 controls the amount of air bypassing the throttle valve 132 by using an idle air control valve 156 in an idle operation state of the internal combustion engine and controls the rotation speed of the internal combustion engine in the idle operation state.

Both of the amount of fuel supply, which is the main control amount of the internal combustion engine, and the timing of ignition are calculated by using output from the thermal type flowmeter 30 as a main parameter. Therefore, improvement in measuring accuracy of the thermal type flowmeter 30 or suppression of a temporal change and improvement in reliability are important in viewpoint of improving a vehicle control accuracy and securing a reliability. Particularly, in recent years, there is a very high demand for fuel saving in a vehicle and there is a very high demand for exhaust gas purification. In order to meet the demand as described above, it is very important to improve the accuracy at which the flow rate of the measurement target gas IA, which is inhaled air, is measured by the thermal type flowmeter 30.

Meanwhile, in the thermal type flowmeter 30 of the related art, since the thickness of the thermal type flowmeter in a direction orthogonal to an insertion direction of the thermal type flowmeter and a flowing direction in an intake pipe is symmetrical (substantially the same in length) with respect to a plane that includes the centroid point of an opening surface at which a dust discharging port or a bypass outlet opens into a main path, that is perpendicular to the opening surface, and that is parallel to the insertion direction of the thermal type flowmeter, under a condition that an intake main stream flows forward from an upstream side to a downstream side, a pair of trailing vortices generated on a downstream side of the thermal type flowmeter becomes substantially symmetrical. As a result, the trailing vortices join each other at a position therebetween and a reverse stream toward a lower end surface of a measurement unit main body of the thermal type flowmeter is generated. Since the reverse stream faces a stream that flows out through the dust discharging port or the bypass outlet and hinders the stream from flowing out, there is a problem that there is a decrease in dust discharging effect and error in measuring a mass flow rate becomes more significant.

Therefore, the invention proposes a thermal type flowmeter in which a reverse stream that is generated due to a trailing vortex on a lower end surface of a measurement unit main body is restrained from hindering an air stream flowing out through at least a dust discharging port. Hereinafter, a specific embodiment thereof will be described.

Example 1

FIGS. 2A to 2D illustrate the external appearance of the thermal type flowmeter 30 according to a first embodiment of the invention. FIG. 2A is a front view of the thermal type flowmeter 30, FIG. 2B is a left side view, FIG. 2C is a rear view, and FIG. 2D is a right side view.

The thermal type flowmeter 30 is provided with a housing 302, a front cover 303, and a rear cover 304. The housing 302 is provided with a flange 312 with which the thermal type flowmeter 30 is fixed to the intake body constituting the main path, an external connection portion (connector portion) 305 that is provided with an external terminal for electrical connection with an external device, and a measurement unit main body 310 for measuring the flow rate of air. In the measurement unit main body 310, a sub path groove for forming a sub path is provided.

The measurement unit main body 310 is configured with the housing 302, the front cover 303, and the rear cover 304 and becomes a casing in which the sub path is formed when the housing 302 is covered with the front cover 303 and the rear cover 304. In the measurement unit main body 310, a circuit package 400 provided with a flow rate measurement unit 602 for measuring the flow rate of the measurement target gas IA flowing in the main path or a temperature measurement unit 452 for measuring the temperature of the measurement target gas IA flowing in the main path is provided (refer to FIGS. 3A and 3B).

When the flange 312 is fixed to the intake pipe (intake path) 71, which is a pipe, the measurement unit main body 310 of the thermal type flowmeter 30 is supported in a main path in a cantilever manner. In FIG. 2A, in order to clarify a positional relationship between the thermal type flowmeter 30 and the intake pipe 71, the intake pipe 71 is illustrated with a virtual line. Accordingly, the thermal type flowmeter 30 is fixed with the measurement unit main body 310 inserted in a direction orthogonal to the main path 124.

The measurement unit main body 310 of the thermal type flowmeter 30 has a long shape that extends from the flange 312 in a direction toward the radial center of the main path 124, a tip end portion on an upper end surface side thereof is provided with a main inlet port 350 (refer to FIG. 2B) for taking a portion of the measurement target gas IA such as the inhaled air into the sub path, and a lower end surface of the measurement unit main body 310 is provided with a bypass outlet 352 (refer to FIG. 2D) for returning the measurement target gas IA from the sub path to the main path 124.

On the upper end surface of the measurement unit main body 310 of the thermal type flowmeter 30, (side to which measurement target gas IA flows) the main inlet port 350 is formed. That is, since the main inlet port is provided to close to a tip end of the measurement unit main body 310 that extends from the flange 312 in the direction toward the radial center of the main path 124, a gas in a portion separated from an inner wall surface of the main path 124, can be taken into the sub path. Accordingly, the possibility of an influence of the temperature of the inner wall surface of the main path is decreased and thus it is possible to suppress a decrease in measurement accuracy of the flow rate or the temperature of a gas.

Furthermore, in the vicinity of the inner wall surface of the main path 124, fluid resistance is great and the flow speed is lower than an average flow speed in the main path. However, in the thermal type flowmeter 30 in the present example, since the tip end portion of the measurement unit 310 that is thin and long and that extends from the flange 312 toward the center of the main path is provided with the main inlet port 350, it is possible to take a gas in the central portion of the main path, of which the flow speed is high, into the sub path (path for measurement). In addition, since a dust discharging port 355 of the sub path is also provided close to a lower end surface of the tip end portion of the measurement unit main body 310, it is possible to return a gas flowing in the sub path to the vicinity of the central portion of the main path 124, in which the flow speed is high.

The measurement unit main body 310 has a long shape that extends along an axis from the outer wall of the main path 124 to the center of the main path 124. However, the width (length in flowing direction of air) of the measurement unit main body 310 is small as in FIGS. 2B and 2D. That is, the width of a side surface of the measurement unit main body 310 of the thermal type flowmeter 30 is small and a front surface thereof has an approximately rectangular shape. Therefore, the thermal type flowmeter 30 can be provided with a sufficiently long sub path with a small fluid resistance with respect to the measurement target gas IA.

The housing 302 is provided with an upper end surface and a lower end surface along the flow of air flowing in the intake pipe 71 and as in FIGS. 2B and 2D, the upper end surface is provided with the main inlet port 350 and the lower end surface is provided with the dust discharging port 355 and the bypass outlet 352.

The temperature measurement unit 452 for measuring the temperature of the measurement target gas IA is provided to have a shape that protrudes from an upstream side outer wall to the upstream side at a position in the central portion of the measurement unit main body 310 at which the upstream side outer wall in the measurement unit main body 310 is recessed toward the downstream side.

Each of the front cover 303 and the rear cover 304 is formed to have a thin plate-like shape and has a shape provided with a wide cooling surface. Therefore, the thermal type flowmeter 30 has an effect that air resistance is reduced and the thermal type flowmeter 30 is likely to be cooled by the measurement target gas flowing in the main path 124.

In the external connection portion 305, an external terminal and a terminal for correction (both are not shown) are provided. The external terminal is configured with a terminal for outputting a flow rate and a temperature, which are measurement results, and a power source terminal for supplying direct-current power. The terminal for correction is a terminal that is used to store a correction value related to the thermal type flowmeter 30 in a memory in the thermal type flowmeter 30.

Next, a configuration of the sub path configured in the housing 302 and a configuration of the circuit package will be described by using FIGS. 3A and 3B. FIGS. 3A and 3B illustrate an internal configuration of the housing 302 in a state where the front cover 303 or the rear cover 304 is removed from the thermal type flowmeter 30. FIG. 3A is a front view illustrating the internal configuration of the housing 302 with the front cover 303 removed from the thermal type flowmeter 30 and FIG. 3B is a rear view illustrating the internal configuration of the housing 302 with the rear cover 304 removed from the thermal type flowmeter 30.

In the housing 302, sub path grooves for forming the sub path on the tip end side of the measurement unit main body 310 are provided. The sub path is a path that is formed in the thermal type flowmeter 30 such that a portion of the measurement target gas flowing in the main path 124 is taken in. In the present example, sub path grooves 331 and 332 are provided on both of front and rear surfaces of the housing 302. A continuous sub path is formed on opposite surfaces of the housing 302 when the front and rear surfaces of the housing 302 are covered with the front cover 303 and the rear cover 304. According to this structure, it is possible to form both of a rear side sub path groove 331 and a front side sub path groove 332 in a portion of the housing 302, to form a penetrating portion 382 that penetrates the housing 302 such that the grooves are connected to each other, and to dispose a flow rate measurement element (flow rate measurement unit) 602 of the circuit package 400 in the penetrating portion 382 by using molds provided on the opposite surfaces of the housing 302 at the time of molding of the housing 302 (resin molding step).

As illustrated in FIG. 3B, a portion of the measurement target gas IA flowing in the main path is taken into the rear side sub path groove 331 from the main inlet port 350 via an inlet groove 351 and flows in the rear side sub path groove 331. When the rear side sub path groove 331 is covered with the rear cover 304, in the thermal type flowmeter 30, a first path 31 and a portion of a second path 32, which is on the upstream side, of the sub path are formed.

The first path 31 is a discharging path for inertial separation of a corrupting substance which is formed to extend from the main inlet port 350 through which the measurement target gas IA flowing in the main path 124 is taken in to the dust discharging port 355 through which a portion of the measurement target gas IA that is taken in is discharged. The second path 32 is a path for flow rate measurement that is formed to extend from a sub inlet port 34 through which the measurement target gas IA flowing in the first path 31 is taken in toward the flow rate measurement unit 602. The main inlet port 350 is open toward the upstream side in the main path 124 while being disposed close to the upper end surface of the measurement unit main body 310, the dust discharging port 355 is open toward the downstream side in the main path 124 while being disposed close to the lower end surface of the measurement unit main body 310, and the opening area of the dust discharging port 355 is smaller than the opening area of the main inlet port 350. Accordingly, it is possible to cause the measurement target gas IA from the main inlet port 350 to be likely to flow to the second path 32 as well.

A path groove of the second path 32 (path extending up to flow rate measurement unit 602), which is a portion of the rear surface sub path groove 331, has a shape of which the depth increases as it goes in the flowing direction and the measurement target gas IA gradually moves in a direction toward the front side as the measurement target gas IA flows along the groove. A rear side sub path groove 334 is provided with a steep inclined portion 347 of which the depth suddenly increases at an upstream side portion 342 of the circuit package 400. A portion of air, which is small in mass, moves along the steep inclined portion 347 and flows toward a measurement flow path front surface 430 at the upstream side portion 342 of the penetrating portion 382 of the circuit package 400 as illustrated in FIG. 4. Meanwhile, since it is difficult for the foreign substance, which is large in mass, to suddenly change the course due to a centrifugal force, the foreign substance cannot flow along the steep inclined portion 347 and flows to a measurement flow path rear surface 431 illustrated in FIG. 4. Thereafter, the foreign substance passes through a downstream side portion 341 of the penetrating portion 382 and flows to the front side sub path groove 332 illustrated in FIG. 3A.

As described above, a portion of the circuit package 400 including the measurement flow path front surface 430 is disposed in a cavity of the penetrating portion 382 and the penetrating portion 382 are connected to the rear side sub path groove 334 and the front side sub path groove 332 on both of right and left sides of the circuit package 400 provided with the measurement flow path front surface 430.

As illustrated in FIG. 3A, in the penetrating portion 382, air which is the measurement target gas IA flows along the measurement flow path front surface 430 from the upstream side portion 342. At this time, heat is transmitted to the flow rate measurement unit 602 for measuring the flow rate via a heat transmission surface provided on the flow rate measurement unit 602 and thus the flow rate is measured. Note that, the principle of flow rate measurement may be a general measurement principle for a thermal type flowmeter and as described in the present example, a configuration for measurement is not particularly limited as long as the flow rate of the measurement target gas flowing in the main path can be measured based on a measurement value measured by the flow rate measurement unit 602 of the circuit package 400.

Both of the measurement target gas IA having passed the measurement flow path front surface 430 and air flowing to the front side sub path groove 332 from the downstream side portion 341 of the circuit package 400 flow along the front side sub path groove 332 and are discharged to the main path 124 via an outlet groove 353 that forms the bypass outlet 352 of the second path 32.

In this example, the second path configured with the rear side sub path groove 334 extends from the tip end portion of the housing 302 in a direction toward the flange, while describing a curve, and the measurement target gas IA flowing in the sub path flows in a direction opposite to the flowing direction in the main path 124 at a position closest to the flange side. At the penetrating portion 382 which is a portion in which the measurement target gas flows in the direction opposite to the flowing direction in the main path, a sensor upstream side path 32a which is provided on a rear surface side of the second path 32 that is provided on one side of the housing 302 is connected to a sensor downstream side path 32b which is provided on a front surface side of the second path 32 that is provided on the other side.

In this example, a tip end side of the circuit package 400 is disposed in the cavity of the penetrating portion 382. The space of the upstream side portion 342 that is positioned on the upstream side of the circuit package 400 and the space of the downstream side portion 341 that is positioned on the downstream side of the circuit package 400 are included in the penetrating portion 382 and as described above, the penetrating portion 382 is drilled to penetrate a front surface side and a rear surface side of the housing 302. Accordingly, as described above, at the penetrating portion 382, the sensor upstream side path 32a which is formed by the front side sub path groove 334 on the front surface side of the housing 302 communicates with the downstream side sub path 32b which is formed by the rear side sub path groove 332 on the rear surface side.

Note that, as illustrated in FIG. 4, a space on the measurement flow path front surface 430 side and a space on the measurement flow path rear surface 431 side are separated from each other by the circuit package 400 inserted into the housing 302 and are not separated from each other by the housing 302. One space formed by the space of the upstream side portion 342, the space of the downstream side portion 341, the space on the on the measurement flow path front surface 430 side, and the space on the measurement flow path rear surface 431 side is continuously formed around the front and rear surfaces of the housing 302 and the circuit package 400 inserted into the housing 302 protrudes in the one space in a cantilevered manner. According to this configuration, it is possible to mold the sub path grooves on the both of front and rear surfaces of the housing 302 through one resin molding step and it is possible to mold a structure that connecting the sub path grooves on both surfaces at the same time.

Note that, the circuit package 400 is fixed while being embedded in fixation portions 372, 373, and 376 of the housing 302 through resin molding. According to the above-described fixation configuration, it is possible to mount the circuit package 400 into the thermal type flowmeter 30 by insert-molding the circuit package 400 in the housing 302 at the same time as when forming the housing 302 through resin molding.

Note that, as illustrated in FIG. 3B, the rear side sub path groove 334 is formed by first path walls 395 which are formed to face each other, a rear side sub path inner circumferential wall (second path wall) 392, and a rear side sub path outer circumferential wall (second path wall) 391. When an inner surface of the rear cover 304 and a tip end portion of each of the rear side sub path inner circumferential wall 392 and the rear side sub path outer circumferential wall 391 in the height direction come into close contact with each other, the first path 31 of the housing 302 and the sensor upstream side path 32a of the second path 32 are formed.

Meanwhile, as illustrated in FIG. 3A, opposite sides of the front side sub path groove 332 are provided with a front side sub path inner circumferential wall (second path wall) 393 and a front side sub path outer circumferential wall (second path wall) 394 and when an inner surface of the front cover 303 and a tip end portion of each of the front side sub path inner circumferential wall 393 and the front side sub path outer circumferential wall 394 in the height direction come into close contact with each other, a downstream side sub path of the housing 302 is formed.

The measurement target gas IA that is taken in through the main inlet port 350 and flows in the first path 31 formed by the rear side sub path groove 334 flows toward the left side from the right side in FIG. 3B. Here, a portion of the measurement target gas IA that is taken in branches to flow into the sub inlet port 34 of the second path 32 which is formed to branch off from the first path 31. As illustrated in FIG. 4, the flowing measurement target gas IA flows toward a flow path 386 which is formed by a front surface of the measurement flow path front surface 430 of the circuit package 400 and a protrusion portion 356 provided on the front cover 303 through the upstream side portion 342 of the penetrating portion 382.

The other of the measurement target gas IA flows toward a flow path 387 which is formed by the measurement flow path rear surface 431 and the rear cover 304. Thereafter, the measurement target gas IA having flowed through the flow path 387 moves to the front side sub path groove 332 through the downstream side portion 341 of the penetrating portion 382 and is merged with the measurement target gas IA flowing in the flow path 386. The merged measurement target gas IA flows in the front side sub path groove 332 and is discharged to the main path through the bypass outlet 352.

The sub path groove is formed such that the curvature of the measurement target gas IA that is guided from the rear side sub path groove 334 to the flow path 386 via the upstream side portion 342 of the penetrating portion 382 is greater than that of a flow path to the flow path 387. Accordingly, a material having a large mass such as a garbage included in the measurement target gas IA is accumulated in the flow path 387 of which the curvature is small.

In the flow path 386, the protrusion portion 356 forms a diaphragm such that the measurement target gas IA becomes a laminar stream with a small vortex. Furthermore, the protrusion portion 356 increases the flow speed of the measurement target gas IA. Accordingly, the measurement accuracy is improved. The protrusion portion 356 is formed on the front cover 303 which is a cover facing a heat transmission surface exposure portion 436 of the flow rate measurement unit 602 provided on the measurement flow path front surface 430.

As illustrated in FIGS. 3A and 3B, in the housing 302, a cavity portion 336 is formed between the flange 312 and a portion in which the sub path grooves are formed. In the cavity portion 336, a terminal connection portion 320, in which a connection terminal 412 of the circuit package 400 and an inner end 361 of an external terminal of the external connection portion 305 are connected to each other, is provided. The connection terminal 412 and the inner end 361 are electrically connected to each other via spot welding, laser welding, or the like.

Next, a configuration according to the present embodiment for suppressing a decrease in dust discharging effect and error in measuring a mass flow rate becoming more significant will be described.

FIG. 5 is a schematic view of a section taken along line B-B in FIG. 2D. Under a condition that an intake main stream flows forward from the upstream side to the downstream side as the measurement target gas IA, the intake main stream flows from an upper side to a lower side as in FIG. 5. At this time, on the downstream side (lower end surface) of the measurement unit main body 310 of the thermal type flowmeter, a pair of trailing vortices IB is generated on end surfaces of the front cover 303 and the rear cover 304, which are present in the thickness direction thereof, to be substantially symmetrical. The trailing vortices IB join each other at a position therebetween and a reverse stream IC toward the lower end surface of the measurement unit main body 310 of the thermal type flowmeter is formed. Since the reverse stream IC faces an air stream that flows out through the dust discharging port 355 or the bypass outlet 352 and hinders the air stream from flowing out, there is a decrease in dust discharging effect or error in measuring a mass flow rate becomes more significant.

With regard to this, in the present embodiment, as illustrated in FIGS. 2D and 5, the thickness (w1+w2) of the measurement unit main body 310 of the thermal type flowmeter at a position of the dust discharging port 355 in a direction orthogonal to an insertion direction of the thermal type flowmeter and a flowing direction in the intake pipe is different lengths (w1≠w2) on the basis of a plane that includes the centroid point P of an opening surface at which the dust discharging port 355 opens into the main path, that is perpendicular to the opening surface, and that is parallel to the insertion direction of the thermal type flowmeter (will be referred to as centroid plane C).

In the present embodiment, a length W1 from the centroid plane C to the rear cover 304 and a length W2 from the centroid plane C to the front cover 303 have a relationship of W1<W2.

Note that, in the present example, the description has been made by using the centroid plane C as a basis. However, the length W1 from the vicinity of the center of the dust discharging port 355 to the rear cover 304 and the length W2 from the vicinity of the center of the dust discharging port 355 to the front cover 303 may have a relationship of W1<W2.

Accordingly, it is possible to make a discharging direction of an air stream ID, which is discharged from the dust discharging port 355, offset from a reverse stream direction of the reverse stream IC. That is, this is because, the possibility of an influence of the reverse stream is decreased if the dust discharging port 355 is open at a position different from a position near an intermediate position since the position of the reverse stream direction of the reverse stream IC is near the intermediate position between the front cover 303 and the rear cover 304 in the thickness direction. That is, the discharging port 355 formed in the lower end surface of the measurement unit main body 310 is disposed to be close to the front cover 303 or the rear cover 304 while being separated from the intermediate position between the front cover 303 and the rear cover 304 in the thickness direction. In other words, in a projection plane of the lower end surface of the measurement unit main body 310 in the thickness direction as seen from a downstream side front surface, the position of an opening of the dust discharging port 355 is separated from the center of the projection plane in the thickness direction.

Furthermore, the discharging port 355 is provided at a position such that a streamline vector of the reverse stream IC that is formed by the trailing vortices generated on the lower end surface of the measurement unit main body 310 and a streamline vector of the air stream ID discharged through the discharging port 355 do not squarely face each other.

As described above, although the air stream ID discharged toward the downstream side from the dust discharging port 355 is generated, the air stream ID does not squarely face the reverse stream IC, the reverse stream IC is not likely to hinder the air stream ID from flowing out and thus it is possible to suppress a decrease in dust discharging effect.

In order to achieve such an operation and effect, it is necessary that lengths from the plane (centroid plane C) that includes the centroid point P of the opening surface at which the dust discharging port 355 opens into the main path, that is perpendicular to the opening surface, and that is parallel to the insertion direction of the thermal type flowmeter become different from each other (w1≠w2) at least in an opening area (area represented by h in FIG. 2D) of the dust discharging port 355 that is formed in the lower end surface of the measurement unit main body 310 of the thermal type flowmeter. In other words, it is sufficient to make the dust discharging port 355 open at a position offset from the reverse stream direction in which the reverse stream IC proceeds.

According to the present embodiment, under a condition that a main stream in an intake pipe flows in a forward direction from an upstream side to a downstream side, a stream flowing out through a dust discharging port does not squarely face a reverse stream that is generated due to a trailing vortex on a lower end surface side of a measurement unit main body of a thermal type flowmeter. As a result, it is possible to suppress a decrease in dust discharging effect.

Example 2

Next, a second embodiment of the invention will be described by using FIGS. 6 to 8.

FIG. 6 is an enlarged view of a portion corresponding to the sub path of the housing 302 in a state where the front cover 303 is removed, in which a portion of the configuration is simplified or omitted. In the present embodiment, the shape of the outlet groove 353 is different from that in Example 1. That is, the shapes of the front side sub path inner circumferential wall (second path wall) 393 and the front side sub path outer circumferential wall (second path wall) 394 on the opposite sides of the front side sub path groove 332 are different from those in Example 1. As a result, the position of the bypass outlet 352 in the height direction is different from that in Example 1.

FIG. 7 is an enlarged view of a right side view, in which a portion of the configuration is simplified or omitted. The thickness (w1+w2) of the measurement unit main body 310 of the thermal type flowmeter at a position of the dust discharging port in the direction orthogonal to the insertion direction of the thermal type flowmeter and the flowing direction in the intake pipe is different lengths (w1≠w2) on the basis of the plane (centroid plane C) that includes the centroid point P of the opening surface at which the dust discharging port 355 opens into the main path, that is perpendicular to the opening surface, and that is parallel to the insertion direction of the thermal type flowmeter. This is the same as in Example 1.

Furthermore, the bypass outlet 352 is disposed in the vicinity of the dust discharging port 355 to be adjacent to and to be parallel to the dust discharging port 355 and the position of an opening thereof is closer to the front cover 303 than a position near the intermediate position of a length (thickness direction) between the front cover 303 and the rear cover 304 of the measurement unit main body 310. Therefore, the bypass outlet 352 and the dust discharging port 35 are disposed to be offset from the reverse stream direction of the reverse stream IC.

FIG. 8 is a sectional view taken along line C-C in FIG. 7. In the present embodiment, in addition to the air stream ID discharged from the dust discharging port 355, an air stream IE that flows out toward the downstream side from the bypass outlet 352 is also generated. As described above, since the bypass outlet 352 is also disposed to be offset from the reverse stream direction of the reverse stream IC, the air stream IE also does not squarely face the reverse stream IC. Therefore, the air stream IE is less likely to be hindered by the reverse stream IC and it is possible to suppress error in measuring a mass flow rate becoming more significant. Furthermore, since a portion of the air stream IE joins the air stream ID, an effect that the stream, of which the intensity (dynamic pressure) has been increased due to the confluence, pushes back the trailing vortices IB in front of the air stream ID toward the downstream side is increased. As a result, the air stream ID is less likely to be hindered by the trailing vortices IB and it is possible to suppress a decrease in dust discharging effect and error in measuring a mass flow rate becoming more significant.

Example 3

Next, a third embodiment of the invention will be described by using FIGS. 9 to 11.

FIG. 9 is an enlarged view of a portion corresponding to the sub path of a front view illustrating the state of the housing with the front cover removed, in which a portion of the configuration is simplified or omitted. In the present embodiment, the shape of the outlet groove 353 is different from that in Example 2. That is, the shapes of the front side sub path inner circumferential wall (second path wall) 393 and the front side sub path outer circumferential wall (second path wall) 394 on the opposite sides of the front side sub path groove 332 are different from those in Example 2 and the area of a path decreases toward the bypass outlet 352.

FIG. 10 is an enlarged view of a right side view, in which a portion of the configuration is simplified or omitted. The thickness (w1+w2) of the measurement unit main body 310 of the thermal type flowmeter at a position of the dust discharging port in the direction orthogonal to the insertion direction of the thermal type flowmeter and the flowing direction in the intake pipe is different lengths (w1≠w2) on the basis of the plane (centroid plane C) that includes the centroid point P of the opening surface at which the dust discharging port 355 opens into the main path, that is perpendicular to the opening surface, and that is parallel to the insertion direction of the thermal type flowmeter. This is the same as in Example 1.

Furthermore, the bypass outlet 352 is disposed in the vicinity of the dust discharging port 355 to be adjacent to and to be parallel to the dust discharging port 355 and the position of an opening thereof is closer to the front cover 303 than a position near the intermediate position of a length (thickness direction) between the front cover 303 and the rear cover 304 of the measurement unit main body 310. Therefore, the bypass outlet 352 and the dust discharging port 35 are disposed to be offset from the reverse stream direction of the reverse stream IC.

FIG. 11 is a sectional view taken along line D-D in FIG. 10. In the present example, since the outlet groove 353 has a shape in which the area of the path decreases toward the outlet 352, a stream is narrowed and the intensity thereof is increased. Therefore, since the intensity (dynamic pressure) of a stream that is formed when a portion of the air stream IE and the air stream ID join each other is further increased, an effect that the trailing vortices IB in front of the air stream ID are pushed back toward the downstream side is further increased. As a result, the air stream ID is less likely to be hindered by the trailing vortices IB and it becomes easier to suppress a decrease in dust discharging effect and error in measuring a mass flow rate becoming more significant.

Example 4

Next, a fourth embodiment of the invention will be described by using FIGS. 12 to 14.

FIG. 12 is an enlarged view of a portion corresponding to the sub path of a front view illustrating the state of the housing with the front cover removed, in which a portion of the configuration is simplified or omitted. Unlike Examples 1 to 3, on the downstream side of the circuit package 400, the bypass outlet 352 is provided in a side surface of the thermal type flowmeter and serves as a terminal end of the sub path.

FIG. 13 is an enlarged view of a right side view, in which a portion of the configuration is simplified or omitted. The thickness (w1+w2) of the measurement unit main body 310 of the thermal type flowmeter at a position of the dust discharging port in the direction orthogonal to the insertion direction of the thermal type flowmeter and the flowing direction in the intake pipe is different lengths (w1≠w2) on the basis of the plane (centroid plane C) that includes the centroid point P of the opening surface at which the dust discharging port 355 opens into the main path, that is perpendicular to the opening surface, and that is parallel to the insertion direction of the thermal type flowmeter. This is the same as in Example 1.

In addition, the position of the opening of the dust discharging port 355 is the same as that in Example 1 and the dust discharging port 35 is disposed to be offset from the reverse stream direction of the reverse stream IC.

FIG. 14 is a schematic view of a section taken along line E-E in FIG. 13. Under a condition that the intake main stream flows forward from the upstream side to the downstream side as the measurement target gas IA, the intake main stream flows from the upper side to the lower side as in FIG. 14. At this time, on the downstream side of the thermal type flowmeter, a pair of trailing vortices IB is generated to be substantially symmetrical. The trailing vortices IB join each other at a position therebetween and the reverse stream IC toward the lower end surface of the measurement unit main body 310 is formed. Meanwhile, the air stream ID discharged toward the downstream side is generated from the dust discharging port 355. Note that, the sectional area of the first path (sub path) 31 to the dust discharging port 355 decreases toward the dust discharging port 355 due to an inclined surface and the flow speed of air is increased when the air passes therethrough.

As described above, since the air stream ID does not squarely face the reverse stream IC, the air stream ID is less likely to be hindered by the reverse stream IC and it is possible to suppress a decrease in dust discharging effect and error in measuring a mass flow rate becoming significant.

Example 5

Next, a fifth embodiment of the invention will be described by using FIGS. 15 and 16.

Although a sub path structure in the present embodiment is similar to that in Example 4, the configuration of the present embodiment is substantially the same as that in Example 4 except for the external shapes of a discharging path and the thermal type flowmeter.

FIG. 15 is an enlarged view of a right side view, in which a portion of the configuration is simplified or omitted. The thickness (w1+w2) of the measurement unit main body 310 of the thermal type flowmeter at a position of the dust discharging port in the direction orthogonal to the insertion direction of the thermal type flowmeter and the flowing direction in the intake pipe is different lengths (w1≠w2) on the basis of the plane (dotted line C) that includes the centroid point P of the opening surface at which the dust discharging port 355 opens into the main path, that is perpendicular to the opening surface, and that is parallel to the insertion direction of the thermal type flowmeter. This is the same as in Example 1.

FIG. 16 is a schematic view of a section taken along line F-F in FIG. 15. Although the shape of a path to the dust discharging port 355 is symmetrical with respect to the plane (centroid plane C) that includes the centroid point P of the opening surface at which the dust discharging port 355 opens into the main path, that is perpendicular to the opening surface, and that is parallel to the insertion direction of the thermal type flowmeter, the external shape of the thermal type flowmeter is unsymmetrical. Since the external shape is unsymmetrical, a pair of trailing vortices IB generated on the downstream side of the thermal type flowmeter is also unsymmetrical.

Therefore, the trailing vortices IB join each other at a position offset from the above-described plane (centroid plane C) such that the reverse stream IC toward the thermal type flowmeter is formed. Meanwhile, the air stream ID discharged toward the downstream side is generated from the dust discharging port 355 but the stream flows substantially along the plane (centroid plane C). As a result, the air stream ID does not squarely face the reverse stream IC. Therefore, the air stream ID is less likely to be hindered by the reverse stream IC and it is possible to suppress a decrease in dust discharging effect and error in measuring a mass flow rate becoming significant.

Note that, the sectional area of the first path (sub path) 31 to the dust discharging port 355 decreases toward the dust discharging port 355 due to an inclined surface and the flow speed of air is increased when the air passes therethrough.

Example 6

Next, a sixth embodiment of the invention will be described by using FIGS. 17 and 18.

Although a sub path structure in the present example is similar to that in Example 4, the configuration in the present embodiment is substantially the same as that in Example 4 except for the external shapes of a discharging path and the thermal type flowmeter.

FIG. 17 is an enlarged view of a right side view, in which a portion of the configuration is simplified or omitted. The thickness (w1+w2) of the measurement unit main body 310 of the thermal type flowmeter at a maximum thickness position of the thermal type flowmeter in the direction orthogonal to the insertion direction of the thermal type flowmeter and the flowing direction in the intake pipe is different lengths (w1≠w2) on the basis of the plane (centroid plane C) that includes the centroid point P of the opening surface at which the dust discharging port 355 opens into the main path, that is perpendicular to the opening surface, and that is parallel to the insertion direction of the thermal type flowmeter. This is the same as in Example 1.

FIG. 18 is a schematic view of a section taken along line G-G in FIG. 17. The shape of a path to the dust discharging port 355 is unsymmetrical with respect to the plane (centroid plane C) that includes the centroid point P of the opening surface at which the dust discharging port 355 opens into the main path, that is perpendicular to the opening surface, and that is parallel to the insertion direction of the thermal type flowmeter and the external shape of the thermal type flowmeter is also unsymmetrical. Since the external shape is unsymmetrical, a pair of trailing vortices IB generated on the downstream side of the thermal type flowmeter is also unsymmetrical. Here, in the present embodiment, although the dust discharging port 355 is closer to the rear cover 304 side, lengths from the centroid plane C are different from each other (w1≠w2) at a maximum thickness position (w1+w2) of the thickness of the thermal type flowmeter.

Therefore, the trailing vortices IB join each other at a position offset from the above-described plane (centroid plane C) such that the reverse stream IC toward the thermal type flowmeter is formed. Meanwhile, the air stream ID discharged toward the downstream side is generated from the dust discharging port 355. Since the air stream ID does not squarely face the reverse stream IC, the discharged stream ID is less likely to be hindered by the reverse stream IC and it is possible to suppress a decrease in dust discharging effect and error in measuring a mass flow rate becoming significant.

Note that, the sectional area of the first path (sub path) 31 to the dust discharging port 355 decreases toward the dust discharging port 355 due to an inclined surface and the flow speed of air is increased when the air passes therethrough.

Hereinbefore, embodiments of the invention have been described in detail, but the invention is not limited to the embodiments, and various design changes can be made in a range not departing from the spirit of the invention described in claims. For example, the embodiments have been described in detail for easy explanation of the invention, but it is not limited to include all of the above-described configurations. In addition, a part of configurations of one embodiment can be substituted with configurations of another embodiment, and configurations of another embodiment may be added to configurations of one embodiment. In addition, addition, deletion, substitution of other configurations can be made with respect to parts of configurations of each embodiment.

REFERENCE SIGNS LIST

30 . . . thermal type flowmeter, 31 . . . first path, 32 . . . second path, 34 . . . sub inlet port, 35 . . . flow resistance portion, 36 . . . protruding portion, 37 . . . throttle portion, 302 . . . housing, 303 . . . front cover, 304 . . . rear cover, 310 . . . measurement unit main body, 350 . . . main inlet port, 352 . . . bypass outlet, 355 . . . dust discharging port, 602 . . . flow rate measurement unit.

The invention claimed is:

1. A thermal flowmeter for measuring a flow rate of a measurement target gas within a main path of an intake pipe, wherein the measurement target gas flows along the main path in a flowing direction from an upstream side to a downstream side, the flowmeter comprising:
a measurement unit main body situated within the intake pipe such that the measurement target gas flows along the main path past the measurement unit main body to generate a reverse stream of the measurement target gas on a lower end surface side of the measurement unit main body;
said measuring unit main body provided with a first sub path into which a portion of a measurement target gas flowing in the main path of the intake pipe is taken along with a corrupting substance and from which a portion of the measurement target gas that is taken is discharged in the flowing direction of the measurement target gas flowing in the main path of the intake pipe and a second sub path which branches off from the first sub path and which is provided with a measurement unit measuring the flow rate of the measurement target gas; and,
wherein a discharging port of the first sub path is provided at a position such that the reverse stream of the measurement target gas and the measurement target gas discharged from the first sub path do not squarely face each other.

2. The thermal flowmeter according to claim 1,
wherein lengths from opposite end surfaces of the measurement unit main body in a thickness direction to a plane that includes a centroid point of an opening surface of the discharging port, that is perpendicular to the opening surface, and that is parallel to an insertion direction of the measurement unit main body, are different from each other.

3. The thermal flowmeter according to claim 1, wherein lengths from opposite end surfaces of the measurement unit main body in a thickness direction to a plane that includes a centroid point of an opening surface of the discharging port, that is perpendicular to the opening surface, and that is parallel to an insertion direction of the measurement unit main body, are different from each other in an opening area of the discharging port.

4. The thermal flowmeter according to claim 1,
wherein an outlet of the second sub path is disposed in the vicinity of the discharging port of the first sub path to be parallel to the discharging port.

5. The thermal flowmeter according to claim 1,
wherein the path sectional area of the first sub path decreases toward the discharging port of the first sub path.

6. A thermal flowmeter for measuring a flow rate of air flowing along a main path of an intake pipe in a downstream direction, the flowmeter comprising:
a measurement unit main body situated within the intake pipe and including an upper end surface side and a lower end surface side, wherein the air flows in the downstream direction initially passing the upper end surface side and subsequently passing the lower end surface side, wherein a reverse stream of the air is formed on the lower end surface side;
wherein the measurement unit main body includes a first sub path into which a portion of the air flowing along the main path is taken and from which a portion of the air is discharged into the main path, and a second sub path which branches off from an intermediate portion of the first sub path and includes a measurement unit measuring the flow rate of the air taken in;
wherein the measurement unit main body includes a housing in which the first sub path the second sub path, the upper end surface side, and the lower end surface side are formed, and wherein the first subpath additionally comprises a discharging port formed in the lower end surface side of the housing; and,
wherein the discharging port includes an opening formed at a position offset from the direction of the reverse stream.

7. The thermal flowmeter according to claim 6,
wherein the measurement unit main body is provided with a front cover and a rear cover that are fixed to opposite side ends of the housing such that the first sub path and the second sub path are covered and a length from a position near the center of the discharging port of the first sub path to the front cover and a length from a position near the center of the discharging port of the first sub path to the rear cover are different from each other.

8. The thermal flowmeter according to claim 7,
wherein the discharging port that is formed in the lower end surface of the measurement unit main body is disposed to be closer to the front cover or the rear cover than an intermediate position between the front cover and the rear cover in a thickness direction.

9. The thermal flowmeter according to claim 6,
wherein an outlet of the second sub path is formed in the lower end surface of the measurement unit main body and an opening surface of the outlet of the second sub path is formed at a position offset from the direction of the reverse stream.

10. The thermal flowmeter according to claim 9,
wherein the outlet of the second sub path and the discharging port of the first sub path are disposed on the lower end surface of the measurement unit main body to be parallel to each other.

11. The thermal flowmeter according to claim 6,
wherein the path sectional area of the first sub path decreases toward the discharging port of the first sub path.

* * * * *